(12) United States Patent
Rico Alvarino et al.

(10) Patent No.: US 12,250,691 B2
(45) Date of Patent: Mar. 11, 2025

(54) FLEXIBLE SCHEDULING FOR MULTICAST WIRELESS COMMUNICATION

(71) Applicant: QUALCOMM Incorporated, San Diego, CA (US)

(72) Inventors: Alberto Rico Alvarino, San Diego, CA (US); Le Liu, Fremont, CA (US); Kazuki Takeda, Tokyo (JP); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 17/379,846

(22) Filed: Jul. 19, 2021

(65) Prior Publication Data
US 2022/0046684 A1    Feb. 10, 2022

Related U.S. Application Data

(60) Provisional application No. 63/061,981, filed on Aug. 6, 2020.

(51) Int. Cl.
| | |
|---|---|
| *H04W 72/23* | (2023.01) |
| *H04L 1/00* | (2006.01) |
| *H04L 1/1812* | (2023.01) |
| *H04L 12/18* | (2006.01) |
| *H04W 4/06* | (2009.01) |

(52) U.S. Cl.
CPC ........... *H04W 72/23* (2023.01); *H04L 1/1812* (2013.01); *H04W 4/06* (2013.01); *H04L 1/0061* (2013.01); *H04L 12/189* (2013.01)

(58) Field of Classification Search
CPC ... H04L 1/0061; H04L 1/1614; H04L 1/1812; H04L 1/1822; H04L 1/1854; H04L 1/1861; H04L 1/1896; H04L 12/189; H04L 2001/0093; H04W 4/06; H04W 72/121; H04W 72/23; H04W 72/30
See application file for complete search history.

(56) References Cited

U.S. PATENT DOCUMENTS

| | | | |
|---|---|---|---|
| 11,711,843 B2* | 7/2023 | Wong | H04L 1/1819 370/329 |
| 2014/0146738 A1* | 5/2014 | Morioka | H04L 1/1861 370/312 |

(Continued)

OTHER PUBLICATIONS

International Search Report and Written Opinion—PCT/US2021/042405—ISA/EPO—Nov. 9, 2021.

*Primary Examiner* — Kashif Siddiqui
(74) *Attorney, Agent, or Firm* — Procopio, Cory, Hargreaves & Savitch LLP

(57) ABSTRACT

A base station multicasts a physical downlink shared channel (PDSCH) transmission and transmits downlink control associated with the PDSCH, wherein the downlink control comprises different parameters for uplink transmissions to multiple user equipments (UEs). A UE receives the associated the PDSCH, where the downlink control comprises different parameters for uplink transmissions to multiple UEs including an uplink transmission parameter for the UE. The UE receives the multicast PDSCH and transmits the uplink transmission based on the uplink transmission parameter for the UE and the multicast PDSCH.

30 Claims, 19 Drawing Sheets

(56) References Cited

U.S. PATENT DOCUMENTS

| | | | |
|---|---|---|---|
| 2014/0226552 A1* | 8/2014 | Niu | H04W 4/06 |
| | | | 370/312 |
| 2014/0286225 A1* | 9/2014 | Yu | H04W 36/08 |
| | | | 370/312 |
| 2015/0126206 A1* | 5/2015 | Krishnamurthy | H04W 56/001 |
| | | | 455/452.1 |
| 2015/0296509 A1* | 10/2015 | Yang | H04L 1/1893 |
| | | | 370/336 |
| 2018/0152274 A1* | 5/2018 | Li | H04W 28/04 |
| 2019/0349971 A1 | 11/2019 | Yu et al. | |
| 2020/0112941 A1* | 4/2020 | Yerramalli | H04W 72/30 |
| 2022/0232522 A1* | 7/2022 | Reial | H04W 72/23 |
| 2022/0264612 A1* | 8/2022 | Yang | H04W 52/0216 |
| 2022/0264613 A1* | 8/2022 | Xu | H04W 72/1273 |
| 2023/0133369 A1* | 5/2023 | Matsumura | H04L 5/0053 |
| | | | 370/329 |

* cited by examiner

| DCI Codepoint | UE1 | UE2 |
|---|---|---|
| 00 | 0 | 1 |
| 01 | 1 | 2 |
| 10 | 1 | 3 |
| 11 | 2 | 3 |

Fields for UE1 902

| DCI Field | Number of Bits |
|---|---|
| FDRA | X |
| TDRA | Y |
| ... | ... |
| K1 | 4 |
| DAI | 2 |
| Spare | 7 |

Fields for UE2 904

| DCI Field | Number of Bits |
|---|---|
| FDRA | X |
| TDRA | Y |
| ... | ... |
| Spare | 6 |
| K1 | 3 |
| DAI | 4 |

- FDRA, TDRA, ...: Common fields across UEs
- K1, DAI (UE1) / Spare (UE2): Used in UE1, spare in UE2
- Spare (UE1) / K1, DAI (UE2): Used in UE2, spare in UE1

FIG. 9

| Type | Meaning |
|---|---|
| 0 | Reserved-ignore |
| 1 | Reserved – check if zero |
| 2 | FDRA |
| 3 | K1 |
| 4 | HPID |
| ... | ... |

FIG. 10

ID
FLEXIBLE SCHEDULING FOR MULTICAST WIRELESS COMMUNICATION

CROSS REFERENCE TO RELATED APPLICATION(S)

This application claims the benefit of and priority to U.S. Provisional Application Ser. No. 63/061,981, entitled "Flexible Scheduling for Multicast Wireless Communication" and filed on Aug. 6, 2020, which is expressly incorporated by reference herein in its entirety.

TECHNICAL FIELD

The present disclosure relates generally to communication systems, and more particularly, to a wireless communication including broadcast or multicast.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus multicasts a physical downlink shared channel (PDSCH) transmission and transmits downlink control associated with the PDSCH, wherein the downlink control comprises different parameters for uplink transmissions to multiple user equipments (UEs).

In another aspect of the disclosure, a method, a computer-readable medium, and an apparatus are provided for wireless communication at a UE. The apparatus receives the associated the PDSCH, where the downlink control comprises different parameters for uplink transmissions to multiple UEs including an uplink transmission parameter for the UE. The apparatus receives the multicast PDSCH and transmits the uplink transmission based on the uplink transmission parameter for the UE and the multicast PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 illustrates example configurations for parameters associated with a set of downlink control information (DCI) codepoints.

FIG. 9 illustrates an example of DCI fields with parameters for different UEs associated with a multicast PDSCH.

FIG. 10 illustrates an example of DCI field types and a corresponding meaning.

DETAILED DESCRIPTION

Figure 1:
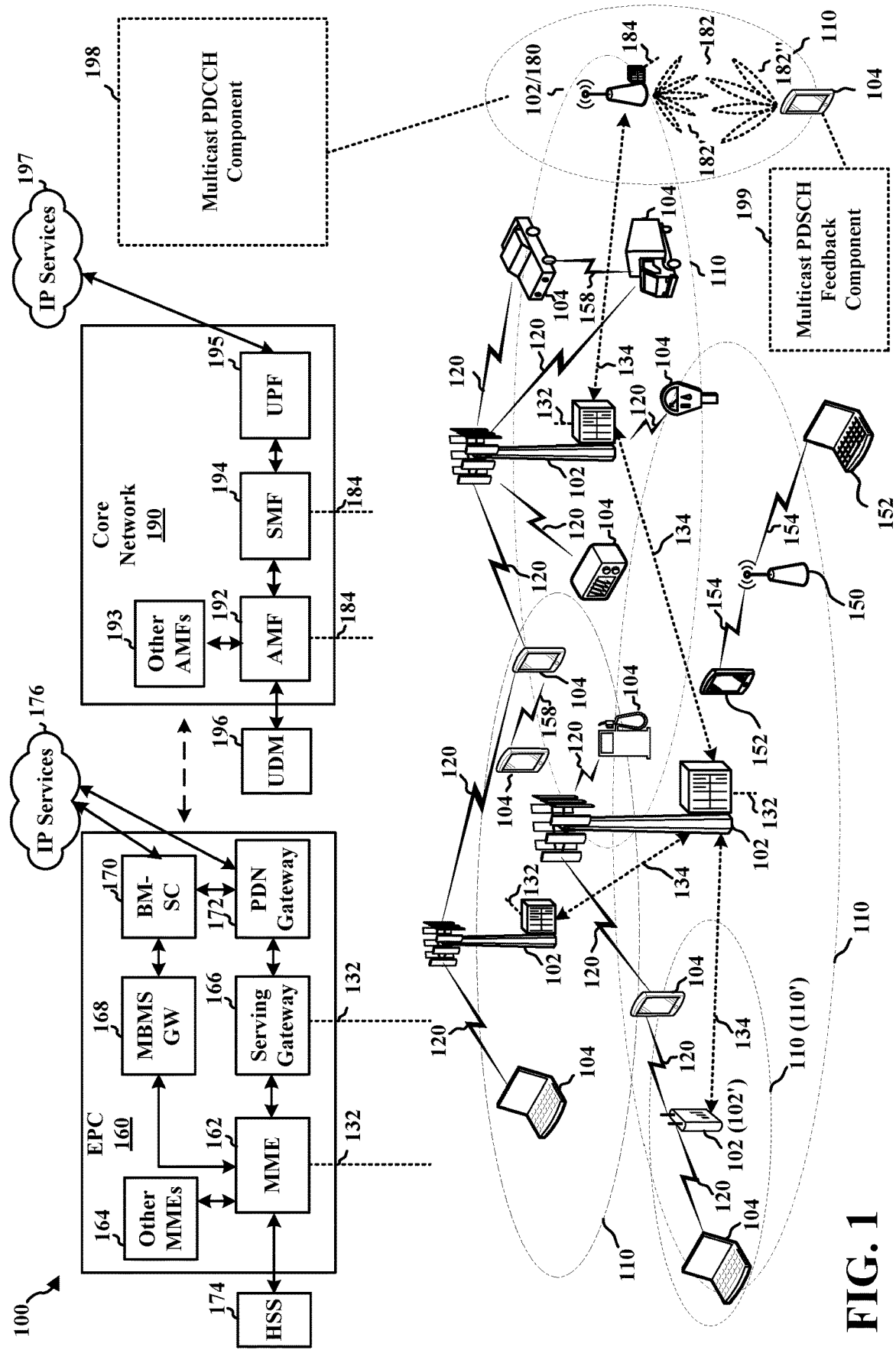
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 or 180 may include a multicast PDCCH component 198 configured to multicast a PDSCH transmission and transmit downlink control associated with the PDSCH, where the downlink control includes different parameters for uplink transmissions to multiple UEs 104. A UE 104 may include a multicast PDSCH feedback component 199 configured to receive the associated the PDSCH, where the downlink control includes different parameters for uplink transmissions to multiple UEs including an uplink transmission parameter for the UE. The UE 104 may receive the multicast PDSCH and the multicast PDSCH feedback component 199 may transmit the uplink transmission based on the uplink transmission parameter for the UE 104 and including HARQ-ACK feedback for the multicast PDSCH. Although the following description may be focused on 5G NR, the concepts described herein may be applicable to other similar areas, such as LTE, LTE-A, CDMA, GSM, and other wireless technologies.

Figure 2:
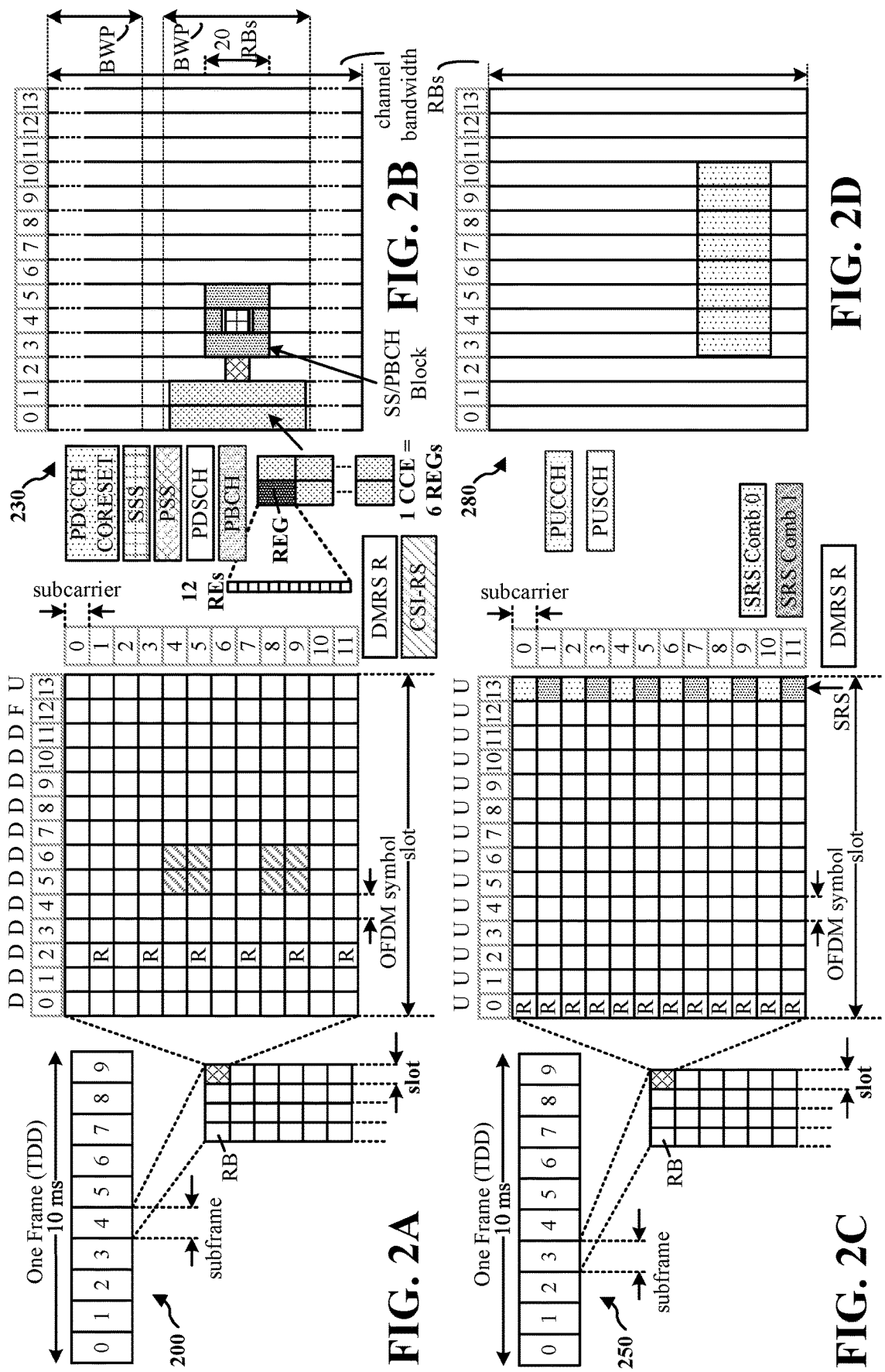
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f =$ $2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
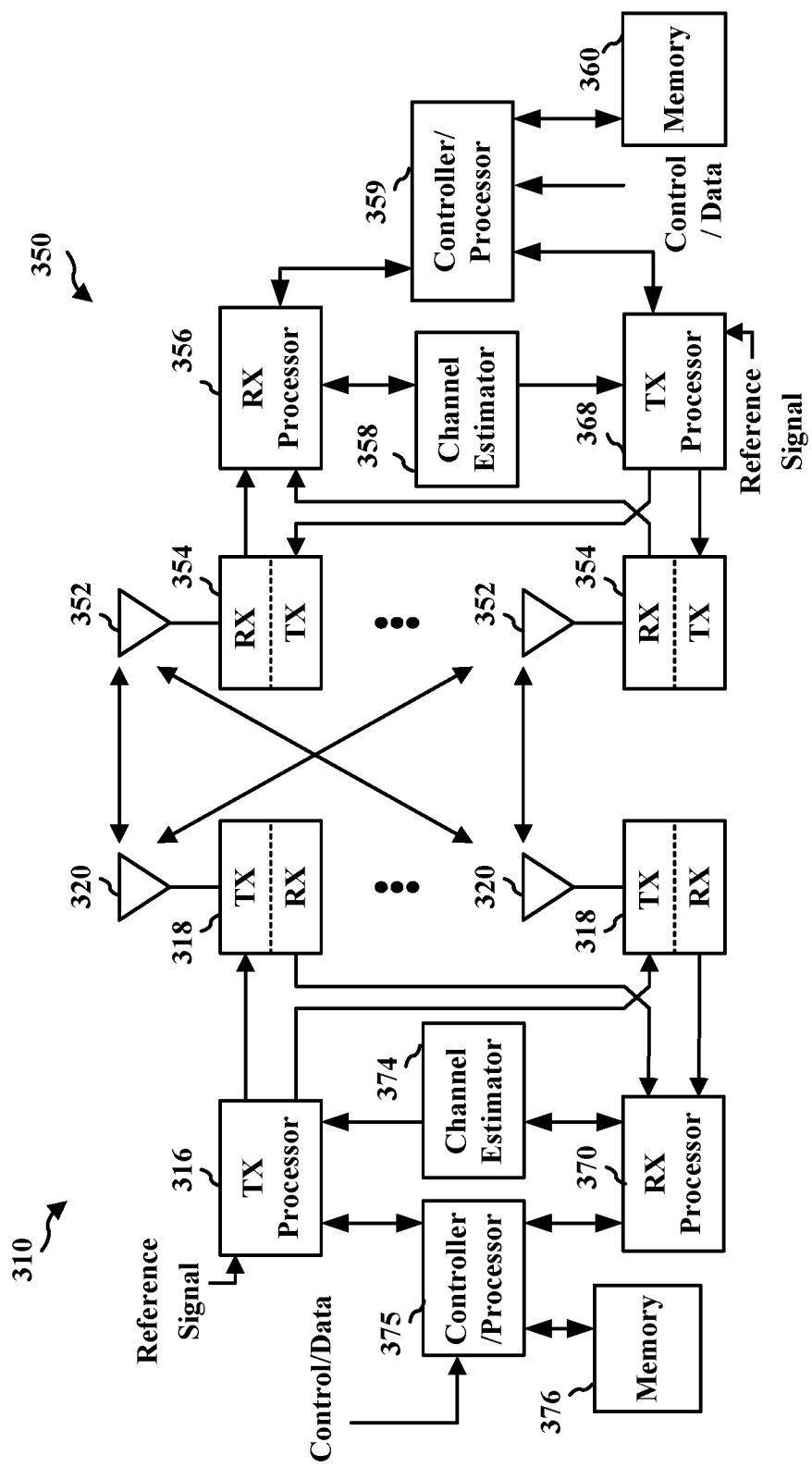
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the multicast PDSCH feedback component 199 of FIG. 1.

At least one of the TX processor 316, the RX processor 370, and the controller/processor 375 may be configured to perform aspects in connection with the multicast PDCCH component 198 of FIG. 1.

Wireless communication may be multicast or broadcast for reception by multiple UEs. A unicast service is a service intended for a specific user, e.g., a voice call. A multicast service is a service that may be received by a group of users, e.g., a subscription video service. A broadcast service is a service that may be received by all users, e.g., a news broadcast. In some examples, a base station may transmit a multicast control channel (MCCH) for each physical multicast channel (PMCH) or a multicast channel (MCH). The base station may broadcast system information that enables a UE to acquire the MCCH. The MCCH may include information related to reception of a multicast service (e.g. information that enables the UEs to receive a multicast service). In some other examples, the UE may receive by other means (e.g. unicast RRC signaling) information related to a multicast service. In yet another example, the information related to a multicast service may be split between broadcast signaling (e.g. MCCH) and unicast signaling (e.g. unicast RRC signaling).

In some examples, the UEs receiving the multicast transmission, e.g., a multicast PDSCH, may provide feedback to the base station, e.g., ACK/NACK feedback or HARQ feedback about whether the multicast transmission was successfully received by a respective UE.

Figure 4:
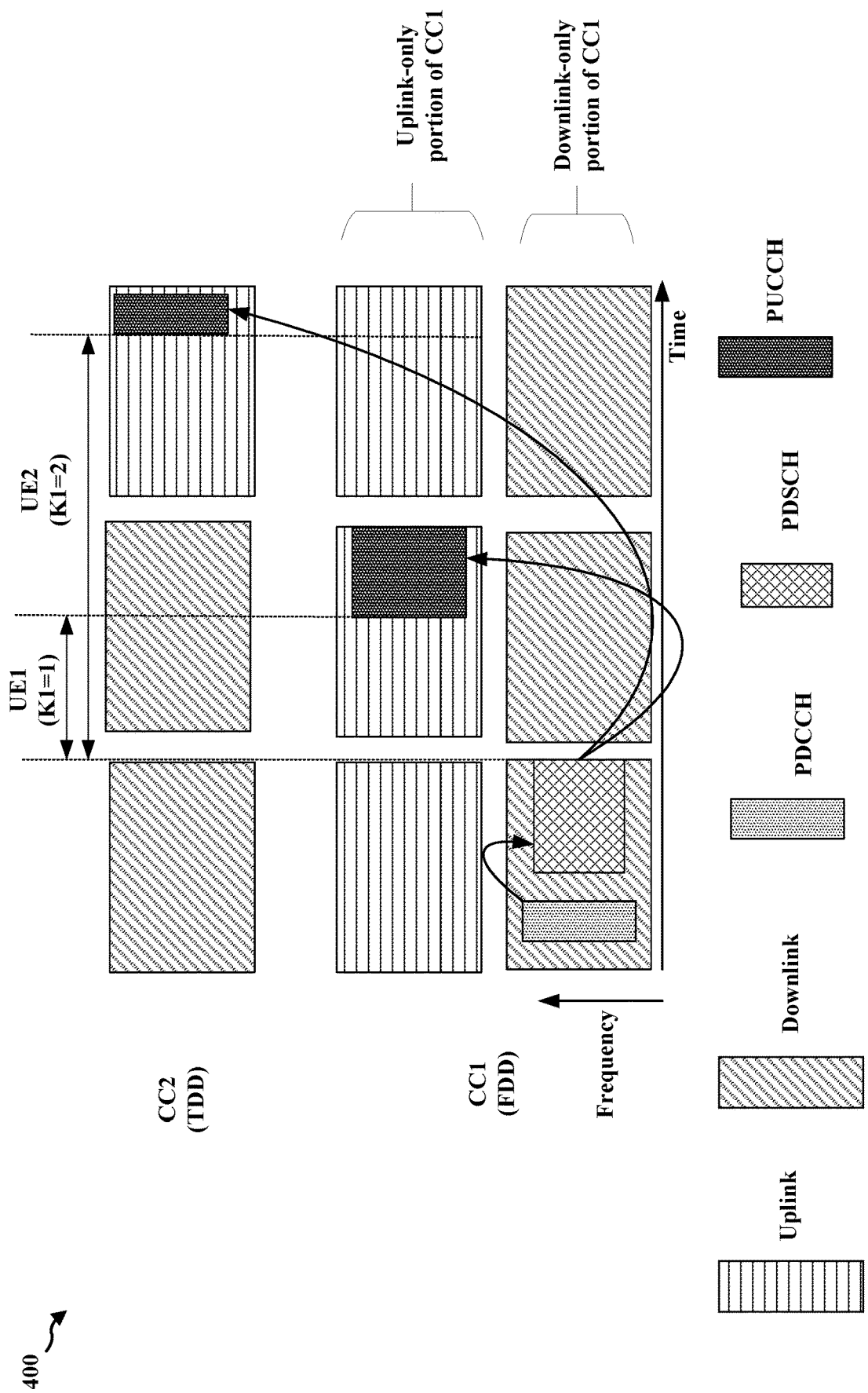
FIG. 4 illustrates an example of downlink control for a multicast PDSCH scheduling different UEs for uplink feedback based on different parameters.

Different UEs may receive the same multicast PDSCH in the same CC, yet may have different configurations. FIG. 4 illustrates an example 400 in which a multicast PDCCH is transmitted in a downlink portion of a carrier (e.g., CC1). The downlink portion of CC1 is downlink-only and does not include time resources for uplink transmission. The CC1 may include an uplink-only portion in different frequency resources than the downlink-only portion, as shown in FIG. 4. A first UE that receives the multicast PDSCH on CC1 may operate in carrier aggregation (CA) receiving downlink communication on the downlink-only portion of CC1 and transmitting uplink on a different CC (e.g., CC2). The other carrier may include resources for uplink transmission that are time division multiplexed (TDM) with downlink resources. A second UE may operate in a non-CA mode and may receive downlink transmissions, including control and the multicast PDSCH, on the downlink-only portion of CC1 and may transmit uplink transmission on the uplink-only portion of CC1. Thus, the two UEs may be configured to provide feedback in different carriers and/or at different times. FIG. 4 illustrates the two UEs having different K1 timing parameters that indicate a time between reception of the PDSCH and transmission of a PUCCH including feedback for the multicast PDSCH. The scheduling for PUCCH, such as for feedback for the multicast PDSCH, may involve separate parameters for different UEs. K1 timing is merely one example of a PUCCH parameter that may be different for different UEs receiving a multicast PDSCH transmission. Among other examples, the UEs may be scheduled for different HARQ-ACK codebooks or may be configured differently for supplementary uplink transmission (SUL) or normal uplink transmission (NUL). For example, one UE may be scheduled for a semi-static codebook, and the other UE may be scheduled for a dynamic codebook. The UEs may be configured for different PUCCH resources. Different DAIs may be indicated for the UEs.

Aspects presented herein enable different UEs receiving the same multicast to be scheduled differently for PUCCH transmissions associated with the same multicast PDSCH.

Figure 6:
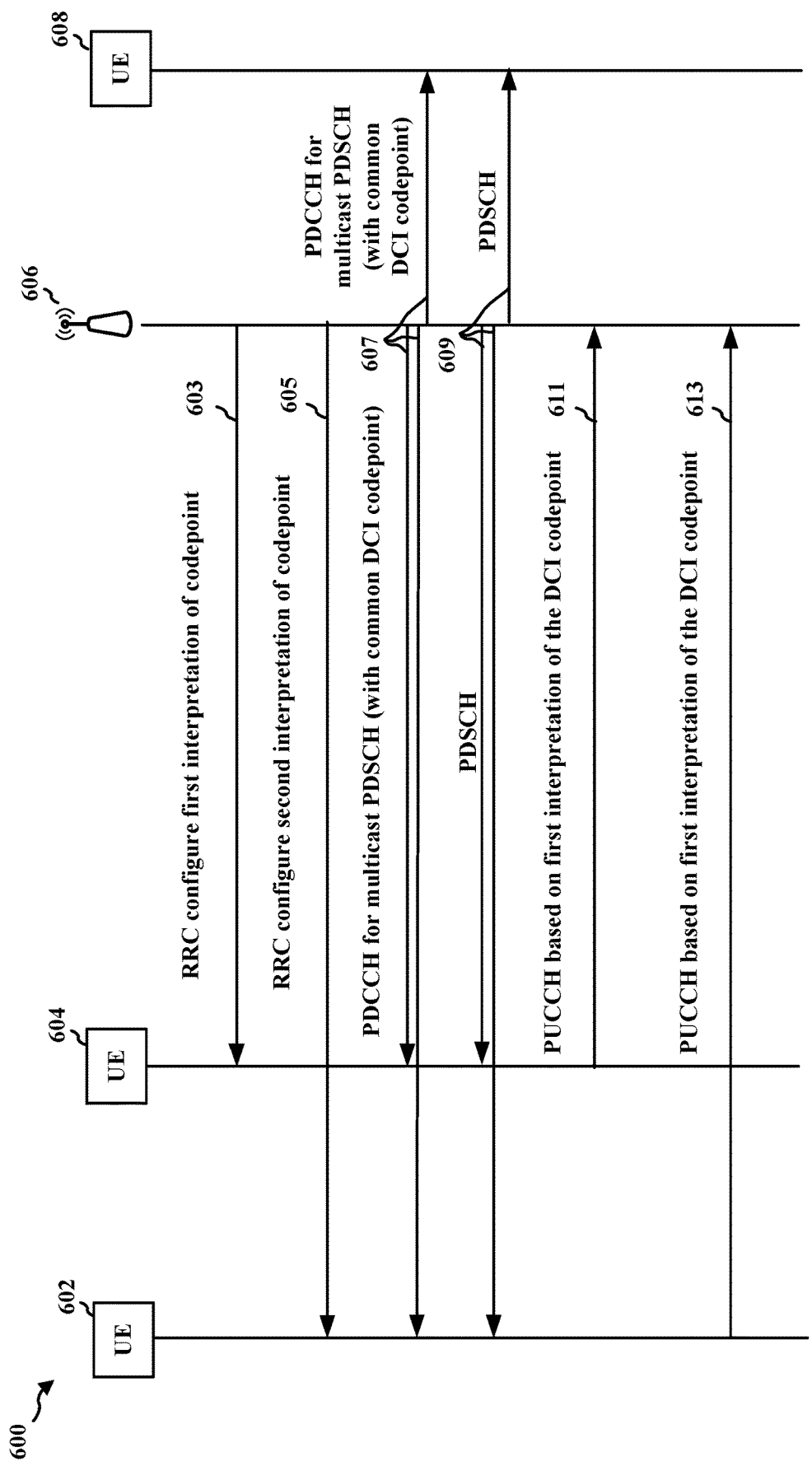
FIG. 6 illustrates an example communication flow between a base station and multiple UEs including the indication of different uplink transmission parameters to the UEs associated with a same multicast PDSCH.

A base station may separately configure each UE to interpret a common field in downlink control signaling (e.g., DCI) for the multicast PDSCH. FIG. 5 illustrates an example DCI codepoint configuration 500 that shows different configurations for a first UE and a second UE. The base station may send the configurations in semi-static signaling, such as a radio resource control (RRC) configuration, to the respective UEs. Then, the base station may dynamically indicate a particular codepoint in DCI for the PDSCH. For example, the PDCCH in FIG. 4 may include a codepoint "01" from FIG. 5. UE1 would interpret "01" to indicate K1=1 based on the configuration that UE1 received in the RRC signaling, and UE2 would interpret "01" to indicate K1=2 based on the RRC configuration for UE2. FIG. 6 illustrates an example 600 of a base station 606 transmitting a first configuration (e.g., RRC configuration 603) for a set of parameters associated with a set of DCI codepoints for a first UE 604. The first configuration may include a first set of downlink data to uplink ACK parameters (e.g., "dl-DataToUL-ACK")={0,1, 1,2}. The base station transmits a second configuration (e.g., RRC configuration 605) for a set of parameters associated with the same set of DCI codepoints for a second UE 602. The second configuration may include a second set of downlink data to uplink ACK parameters (e.g., "dl-DataToUL-ACK")={1, 2, 3, 3}, similar to the example configurations in FIG. 5. The base station multicasts PDCCH 607 that includes a common field indicating the DCI codepoint. The field is a common field because it is used by multiple UEs to determine a PUCCH parameter associated with the multicast PDSCH 609. Multiple lines are used to illustrate the PDCCH 607 and PDSCH 609 multicast transmissions merely to show that the multicast transmissions are received by multiple UEs. The PDCCH 607 is multicast as a single transmission by the base station 606, and the PDSCH 609 is multicast as a single transmission. The UE 604 transmits PUCCH 611 including HARQ-ACK feedback based on the DCI codepoint in the PDCCH 607 and the RRC configuration 603. The UE 602 transmits PUCCH 613 with HARQ-ACK feedback based on the DCI codepoint in the PDCCH 607 and the RRC configuration 605.

The base station may skip sending the RRC configuration of parameters associated with the DCI codepoint for the common field of the DCI. Such UEs that do not receive a configuration prior to receiving the DCI may skip sending HARQ-ACK feedback. For example, the base station 606 does not send an RRC configuration for the DCI codepoint to the UE 608. When the UE 608 receives the PDCCH 607 including the codepoint, and the PDSCH 609, the UE 608 does not transmit HARQ feedback. This enables the base station 606 to selectively activate HARQ-ACK feedback across UEs by sending the earlier configuration for the common DCI field or refraining from sending the configuration to a UE to interpret the common DCI field. In other examples, the base station 606 may indicate explicitly to UE 608 (e.g. by RRC) that UE 608 does not transmit HARQ feedback.

Figure 7:
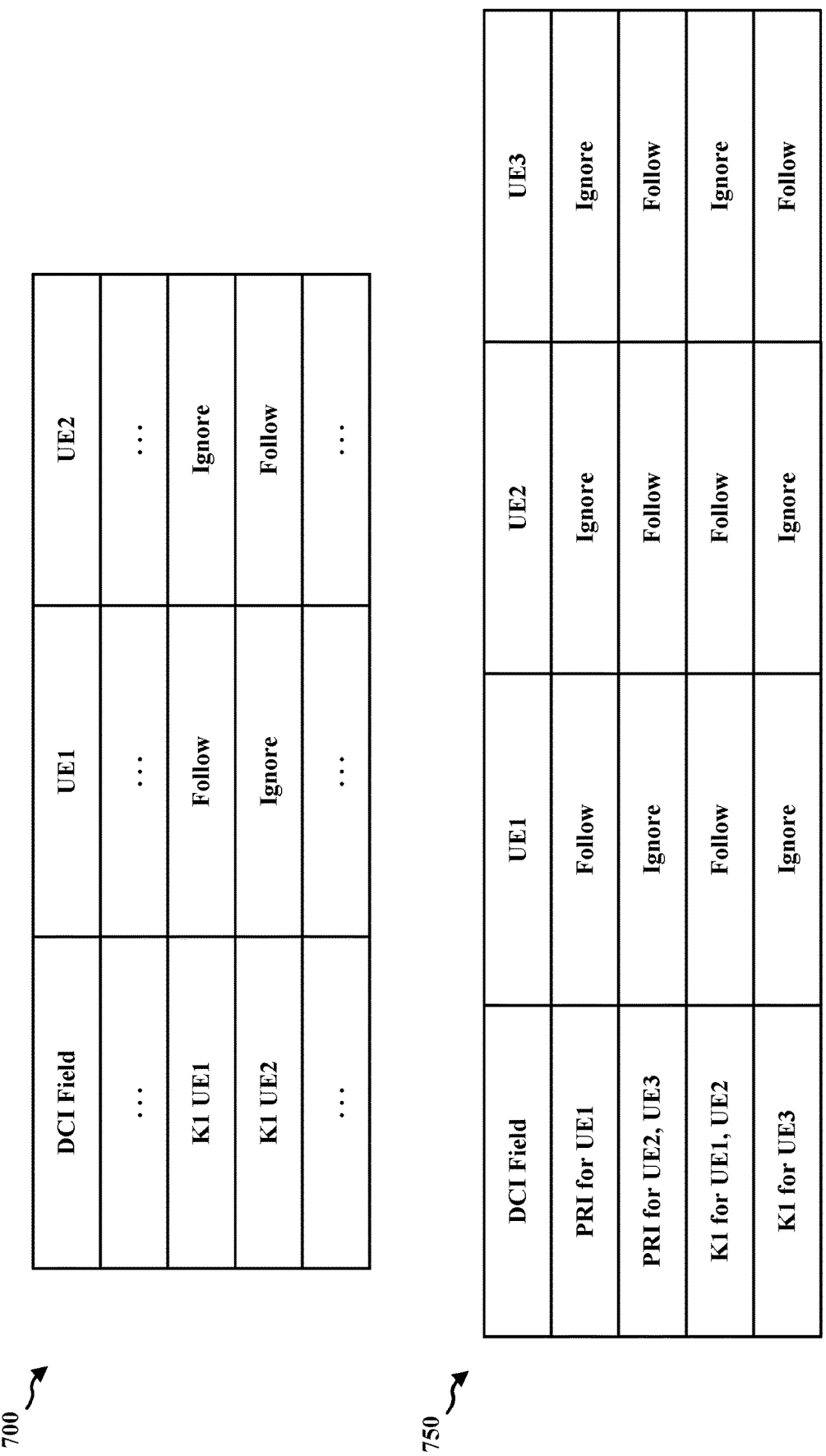
FIG. 7 illustrates an example of DCI fields with parameters for different UEs associated with a multicast PDSCH.
Figure 8:
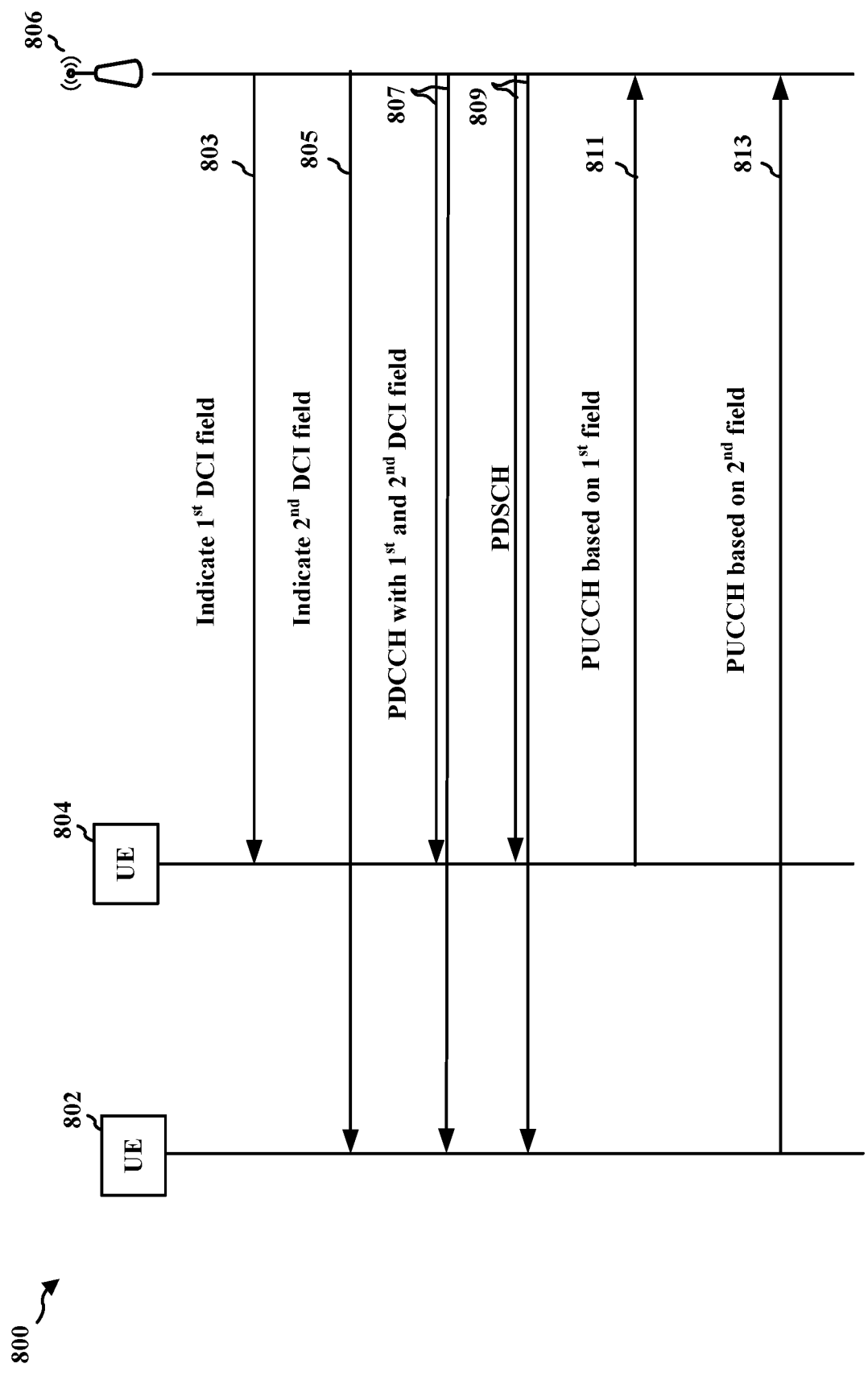
FIG. 8 illustrates an example communication flow between a base station and multiple UEs including the indication of different uplink transmission parameters to the UEs associated with a same multicast PDSCH.

In some examples, rather than send a separate RRC configuration to each UE, the base station may include multiple fields in the PDCCH, e.g., a field for each UE. Then, each UE may monitor a corresponding field and may ignore the other fields in the PDCCH. As an example, to illustrate the concept, FIG. 7 illustrates an example of DCI fields 700 that include a K1 parameter for a first UE (UE1) and a K1 parameter for a second UE (UE2). UE1 may follow the K1 parameter in the field for UE1 and may ignore the K1 parameter for UE2, as shown in FIG. 7. Although this example is illustrated for two UEs, the concept may be applied to any number of multiple UEs. FIG. 8 illustrates an example communication flow 800 in which the base station 806 multicasts a PDCCH including a first DCI field for a first UE 804 and a second DCI field for a second UE 802. The base station 806 may provide signaling 803 and 805 to each UE indicating which field pertains to that UE. The UE may use the information to monitor the corresponding field in the DCI. The UE 804 transmits feedback for the multicast 809 in the PUCCH 811 based on the first field in the DCI of the PDCCH 807, and the UE 802 sends feedback for the multicast PDSCH 809 in the PUCCH 813 based on the second field in the DCI of the PDCCH 807. The example 750 in FIG. 7 illustrates that the PDCCH may include fields for other PUCCH related parameters, such as a PUCCH resource indicator (PRI) field. As well, the concept may be applied to parameters beyond K1 and PRI field, and may include other PUCCH parameters associated with the PDSCH, such as codebook, downlink assignment indicator (DAI), SUL/NUL, different PUCCH resources, a PUCCH power control parameter, etc. The inclusion of different fields may be provided added scheduling flexibility for different UEs.

The fields that a UE is configured to monitor may be non-contiguous. For example, for a 4 bit field including, the UE 802 may be configured to monitor the first two bits, ignore the next two bits, and monitor the follow two bits, e.g., [b0 b1 X b3 b4]. UE 804 may be configured to monitor the first four bits and ignore the following two bits, e.g., [b0 b1 b3 b4 X X].

In some examples, the DCI of the PDCCH 807 may include a self-contained configuration. Each UE (e.g., UE 802 and 804) may receive the whole configuration for the DCI, which enables the DCI to have added configurability by the base station 806. The DCI of the PDCCH 807 may include a sequence of fields, and each of the fields may be configured separately. The set of fields configured for different UEs may be different. For example, if a particular UE is not configured with a K1 parameter, a downlink assignment indicator (DAI), or another parameter relating to feedback, the UE may skip sending HARQ-ACK feedback to the base station 806.

FIG. 9 illustrates a sequence of fields 902 or 904 that may be indicated in the DCI of the PDCCH 807 for the UE 804 and the UE 802. The sequence of fields may include fields that are configured in common across multiple UEs. Other fields may be indicated as spare bits for one or more UEs. For example, for UE 1, a set of bits are indicated as being "spare" that are used to configure a K1 and DAI for UE 2. Similarly, for UE2, a set of bits are indicated as being "spare" that are used to configure the K1 and DAI for UE 1. The indication of "spare" bits indicates that the UE may ignore the bits. In some examples, rather than using the term "spare," the bits may be referred to as "reserved" bits, "ignored bits," "disregarded bits," etc. The UE may interpret or ignore bits in the sequence of fields based on an indication from the base station. The UE may ignore or disregard the spare bits without knowing the use of the bits for another UE, for example.

As an example, each UE may receive a DCI configuration (e.g., at 803 or 805) that includes a sequence of (size(1 . . . maxNumberFields)) of DCI fields. Each DCI field may be configured to include a type and a length. The type may be indicated as an integer number, which may have a corresponding meaning. The corresponding meaning may be defined or preconfigured. FIG. 10 illustrates a table 1000 of example integers that may be used to indicate a type of DCI and the corresponding meaning. The integer "0" may indicated reserved bits/spare bits that may be ignored by the UE, "1" may indicate a different type of reserved bits that may be used for forward compatibility, "2" may correspond to a frequency domain resource assignment (FDRA) parameter for the UE, "3" may correspond to a K1 parameter for the UE, "4" may correspond to a HARQ process identifier (HPID) parameter for the UE, and so forth. For each DCI field, a bit length may also be indicated, e.g., such as an integer number between 1-4 indicating between 1-4 bits of the DCI sequence that correspond to the DCI field for the UE. Some fields, such as FDRA, time domain resource assignment (TDRA), etc. may not be configured for the UE directly by RRC signaling from the base station, and may instead be defined, preconfigured, or may be derived based on other configuration parameters (such as a bandwidth part (BWP)). The remaining fields may be configured, as described herein.

In some examples, some of the fields, such as FDRA, TDRA, etc., may be fixed. The base station may signal starting point information to the UEs for the other, non-fixed fields. For example, the base station may indicate a starting point in the DCI and a bit length for each of the non-fixed DCI fields. In this example, in addition to the DCI field type and length described in connection with FIG. 10, the DCI configuration (e.g., 803 or 805) may further include a starting bit indication for each DCI field.

Figure 11:
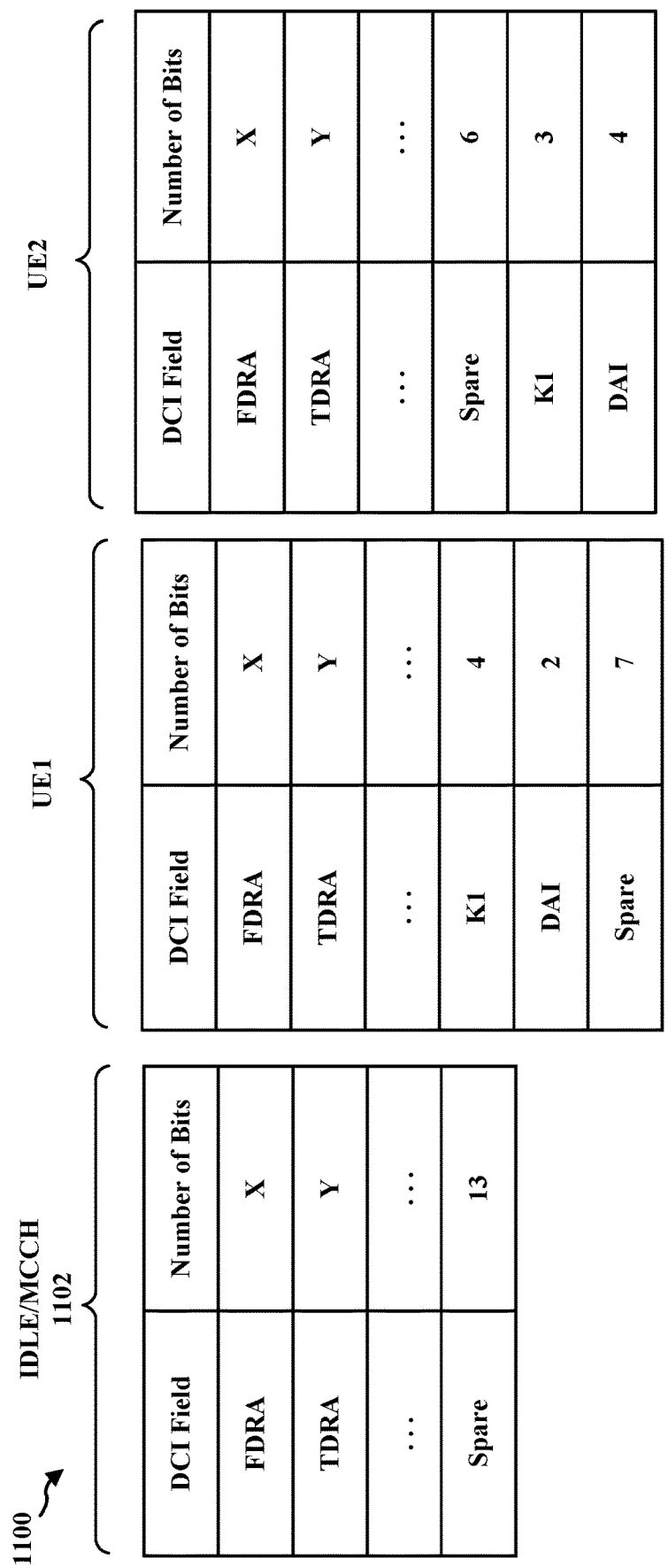
FIG. 11 illustrates an example of DCI fields with parameters for different UEs associated with a multicast PDSCH.

In some examples, the PDCCH may provide a delta configuration relative to a basic configuration or a default configuration. In some examples, the basic configuration may be an idle mode configuration. FIG. 11 illustrates and example 1100 of an idle mode configuration 1102 that includes a spare number of bits that may be used for individual PUCCH parameters for different UEs receiving a multicast. Some of the spare bits of the idle mode configuration 1102 may be used for additional functionality in a connected mode, for example. The DCI in the PDCCH 807 may include only the spare bits, e.g., the 13 spare bits in FIG. 11, in order to indicate the PUCCH parameters for the two UEs that differ from the idle mode configuration 1102. For example, the PDCCH 807 may skip sending the X bits for the FDRA and the Y bits for the TDRA, because there is no change or difference from the idle mode configuration. Instead, the PDCCH 807 may include 4 bits that indicate a K1 parameter for UE 802, 2 bits that indicate a DAI parameter for UE 802, 3 bits that indicate a K1 parameter for UE 804, and 4 bits that indicate a DAI parameter for UE 804. The base station 806 may indicate at 803 the bits of the delta configuration that apply to the UE 804 and, at 805, the bits of the delta configuration that apply to the UE 802. Each UE may determine PUCCH parameters from the indicated bits of the PDCCH 807 and may disregard the other bits.

Figure 12:
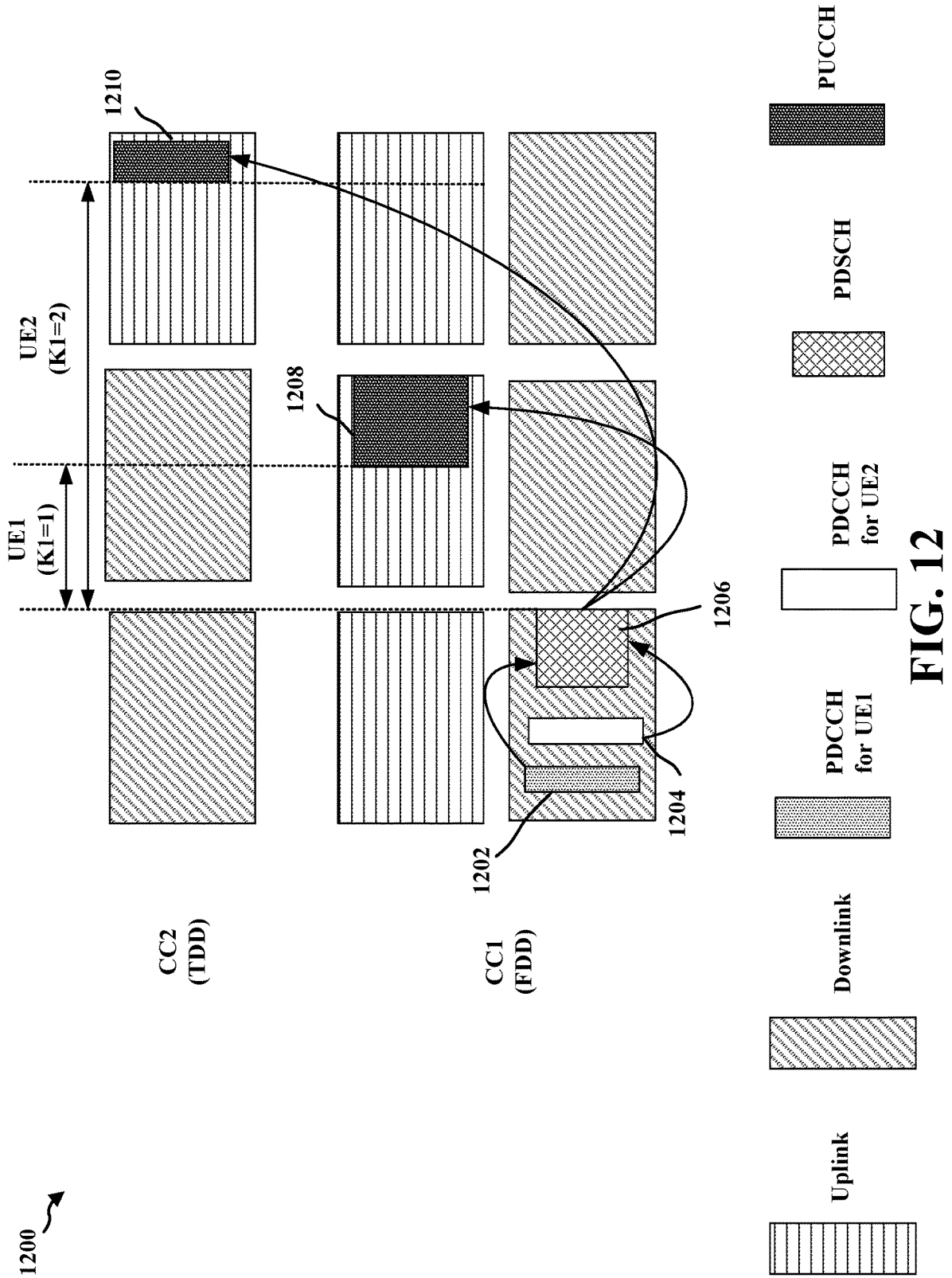
FIG. 12 illustrates an example of multiple physical downlink control channels (PDCCH) for different UEs scheduling a same PDSCH and having different uplink parameters.

In some examples, the base station may transmit multiple DCI, e.g., in separate PDCCH, that schedule the same multicast PDSCH for different UEs and that schedule corresponding PUCCH parameters for the different UEs. FIG. 12 illustrates an example 1200 of PDCCH 1202 for a first UE that schedules reception of a multicast PDSCH 1206 and corresponding HARQ feedback on PUCCH 1208 for the first UE. A second PDCCH 1204 schedules reception of the same multicast PDSCH 1206 and corresponding HARQ feedback on PUCCH 1210 for a second UE.

In order to enable multiple PDCCH scheduling the same multicast PDSCH for different UEs, the base station may configure different search spaces for different UEs in a TDM manner. Different UEs may have different sizes of search spaces, or different DCI sizes, for example. In some examples, the base station may transmit the PDCCH for different UEs in overlapping time, frequency, search space size, etc. For example, the base station may use a same time and frequency resource to transmit PDCCH to different UEs. In order for the UEs to distinguish between the two PDCCHs, the base station may use a first identifier for the first PDCCH and a second identifier for the second PDCCH. As an example, the first PDCCH may use a first radio network temporary identifier (RNTI), and the second PDCCH may use a second RNTI. The multicast PDSCH may use a different identifier than either PDCCH. For example, the multicast PDSCH 1206 may use a group radio network temporary identifier (G-RNTI). Thus, each UE may receive a configuration for an RNTI to receive the corresponding PDCCH and the G-RNTI to receive the multicast PDSCH 1206. In some examples, a field of the PDCCH may indicate the G-RNTI of the PDSCH in order to enable the UE to decode the multicast PDSCH.

In some examples, the PDCCH 1202 may include CRC bits that are associated with a C-RNTI, the PDCCH 1204 may include CRC bits that are associated with a different C-RNTI, and the PDSCH 1206 may be scrambled using a G-RNTI.

A PDCCH may be associated with an identifier based on at least one of: coded bits of the PDCCH being scrambled by a sequence initialized by the identifier, a search space candidate for the PDCCH being based on the identifier, or a cyclic redundancy check (CRC) for the being scrambled by the identifier.

Alternately, the PDCCH 1202 may include CRC bits that are associated with a first G-RNTI, the PDCCH 1204 may include CRC bits that are associated with a second G-RNTI, and the PDSCH 1206 may be associated with a third G-RNTI. The third G-RNTI may potentially be different than the G-RNTI of the first and the second PDCCH.

Thus, different PDCCH scrambling may be used to enable the UEs to differentiate between the different PDCCH that schedule the same multicast PDSCH. As an example, a common search space (CSS) may use a cell ID, and a UE specific search space (USS) may use the cell ID+a scrambling ID. Aspects presented herein provide for the base station to configure separate scrambling for the PDCCH (e.g., $n_{ID}$ or $n_{RNTI}$) for different PDCCH for different UEs in the search spaces for the multicast.

In some examples, the PDCCH 1202 and 1204 may indicate the multicast service that is included in the PDSCH. For example, the PDCCH may use a C-RNTI and may include an indication, e.g., in DCI, whether the DCI is for a transmission with the same C-RNTI or a G-RNTI. If there are multiple G-RNTIs, the DCI may include enough bits to indicate which of the G-RNTIs the DCI is targeting. Multiple multicast services can be associated with the same G-RNTI. Different multicast services may use different logical channels. A multicast service may be a multicast QoS flow. In some examples, if the UE receives a DCI associated with a RNTI and/or multicast service that the UE is not configured to receive, the UE may ignore the DCI (e.g. refrain from decoding the corresponding PDSCH and/or providing HARQ-ACK feedback).

A UE may support multiple aspects described herein, and a base station may combine different aspects in providing signaling to different UEs.

For example, for a group of eight UEs including UE1, UE2, UE3, UE4, UE5, UE6, UE7, and UE8, a group of UE1, UE2, UE3, and UE4 may monitor for a PDCCH based on a first RNTI, and UE 5, UE6, UE7, and UE8 may monitor for a PDCCH based on a second RNTI, such as described in connection with FIG. 12. From within the first group of UE1, UE2, UE3, and UE4, UE1 and UE2 may monitor a first field, and UE2 and UE3 may monitor a second field, such as described in connection with FIG. 7 or 8. Additionally, UE1 may apply a configuration to interpret a codepoint of the DCI in the PDCCH, such as described in connection with FIG. 5 or FIG. 6.

Figure 13:
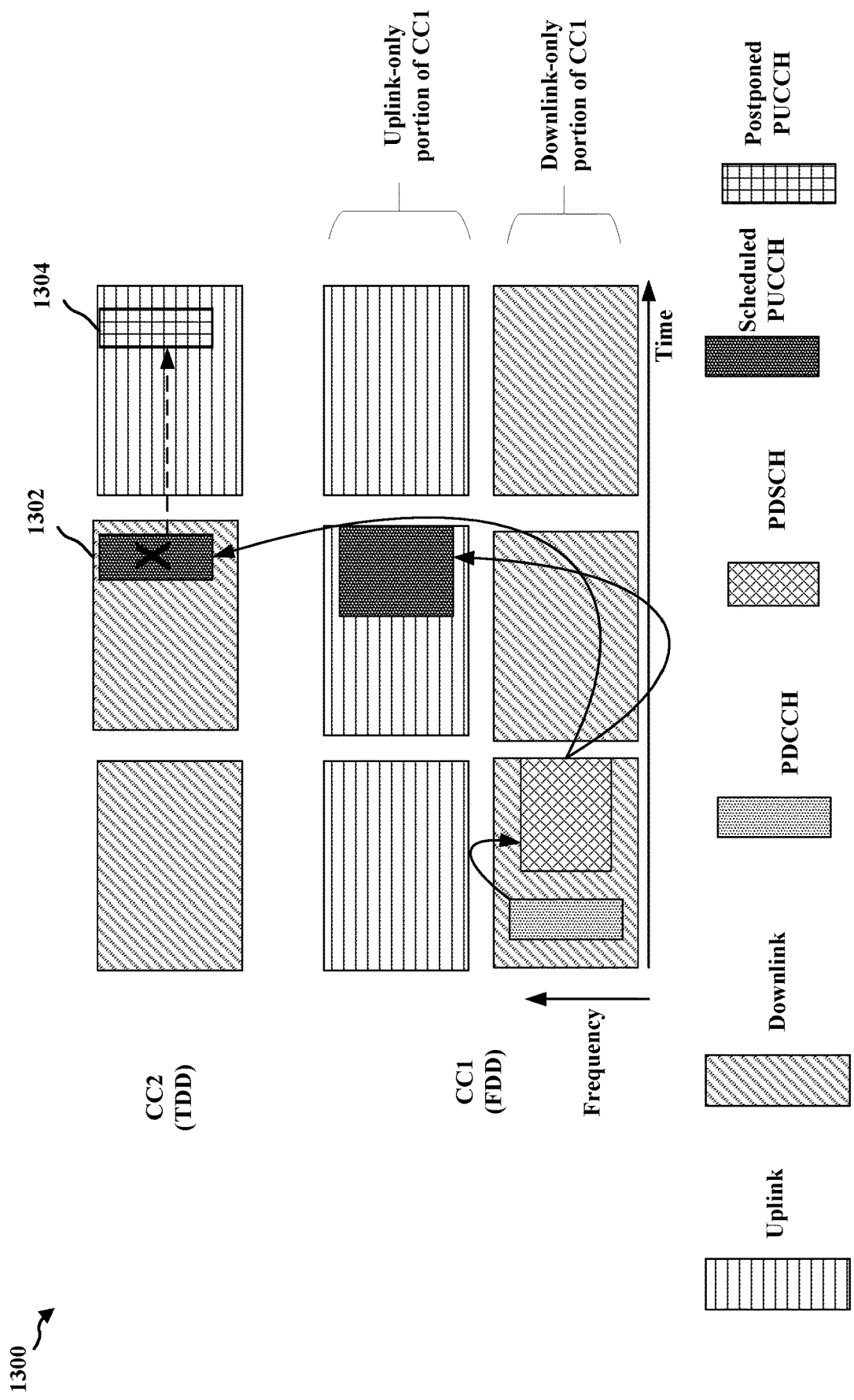
FIG. 13 illustrates an example of a UE postponing uplink feedback to a next slot based on a scheduled slot being a downlink-only slot.

For HARQ-ACK feedback, the (e.g., UE 602, 604, 802, or 804) may postpone the HARQ-ACK (e.g., 611, 613, 811, or 813) until a next slot if a slot in which the UE is scheduled to transmit the HARQ-ACK is not an uplink slot. FIG. 13 illustrates an example in which PUCCH 1302 is scheduled for one of the UEs during a downlink-only slot on CC2. The UE may postpone the HARQ-ACK feedback until the next slot and may transmit PUCCH 1304 including the HARQ-ACK feedback in the following uplink slot. Although example 1300 illustrates a single PDCCH, it may similarly be applied to the multiple PDCCH example in FIG. 12. For a unicast transmission, if the HARQ-ACK feedback is scheduled in a slot that is not an uplink slot, the UE may drop the transmission of the HARQ-ACK feedback rather than postpone the HARQ-ACK feedback.

Figure 14:
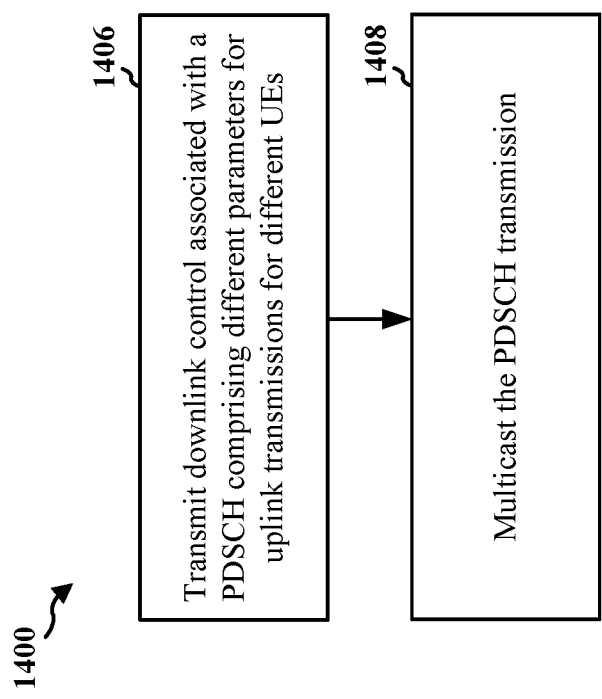
FIG. 14 is a flowchart of a method of wireless communication.

FIG. 14 is a flowchart 1400 of a method of wireless communication. The method may be performed by a base station (e.g., the base station 102/180, 606, 806; the apparatus 1602.

At 1406, the base station transmits downlink control associated with a multicast PDSCH transmission, where the downlink control includes different parameters for uplink transmissions to multiple UE. The transmission may be performed, e.g., by the PDCCH component 1642 of the apparatus 1602 in FIG. 16. Different aspects for indicating the different parameters to the UEs are described in connection with FIGS. 4-12. Any combination of aspects may be applied to indicate different parameters to different UEs.

At 1408, the base station multicasts a PDSCH transmission. For example, FIGS. 4, 6, 8, 12, and 13 illustrate example aspects of a multicast PDSCH transmission. The transmission of the multicast may be performed, e.g., by the multicast PDSCH component 1640 of the apparatus 1602 in FIG. 16.

Figure 15:
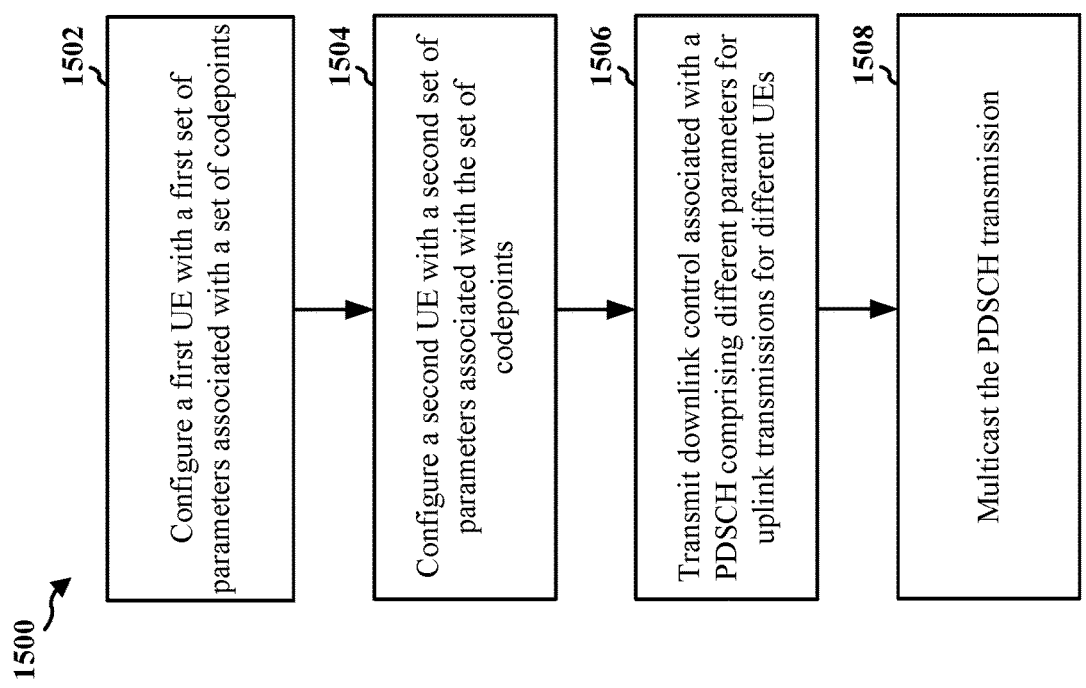
FIG. 15 is a flowchart of a method of wireless communication.

FIG. 15 is a flowchart 1500 of a method of wireless communication. The method may be performed by a base station (e.g., the base station 102/180, 606, 806; the apparatus 1602. The method of flowchart 1500 includes the aspects of the flowchart 1400 and illustrates examples of additional aspects.

At 1506, the base station transmits downlink control associated with a multicast PDSCH transmission, where the downlink control includes different parameters for uplink transmissions to multiple UE. The transmission may be performed, e.g., by the PDCCH component 1642 of the apparatus 1602 in FIG. 16. Different aspects for indicating the different parameters to the UEs are described in connection with FIGS. 4-12. Any combination of aspects may be applied to indicate different parameters to different UEs. The different parameters may include different timing parameters for hybrid automatic repeat request (HARQ) feedback. The different parameters may include the different timing parameters between reception of the PDSCH and transmission of the HARQ feedback. The different parameters may include different parameters for a hybrid automatic repeat request (HARQ) codebook. The different parameters may be for a supplementary uplink (SUL) transmission or a normal uplink (NUL) transmission. The different parameters may include different DAI, for example.

At 1508, the base station multicasts a PDSCH transmission. For example, FIGS. 4, 6, 8, 12, and 13 illustrate example aspects of a multicast PDSCH transmission. The transmission of the multicast may be performed, e.g., by the multicast PDSCH component 1640 of the apparatus 1602 in FIG. 16.

As illustrated at 1502, the base station may configure a first UE with a first set of parameters associated with a set of codepoints. At 1504, the base station may configure a second UE with a second set of parameters associated with the set of codepoints. The downlink control that is transmitted at 1506 may include a codepoint from the set of codepoints, such as described in connection with FIG. 5 or FIG. 6. The configuration may be performed, e.g., by the configuration component 1644 of the apparatus 1602 in FIG. 16.

The downlink control may indicate a set of parameters and for each parameter indicates to each of the multiple UEs which parameter of the set of parameters to apply, such as described in connection with any of FIGS. 7-11. The downlink control may include DCI including a sequence of fields, each of the fields being configured separately. The sequence of fields may include one or more of: a first reserved type of field, which the UE ignores; and a second reserved type of field, which the UE compares with a value, e.g., as described in connection with FIG. 10. The downlink control may indicate changes for the different parameters relative to an idle mode configuration, e.g., a delta configuration such as described in connection with FIG. 11.

The downlink control may include one or more fields that are defined or derived from a separate configuration. The downlink control may include one or more fixed fields. The downlink control may indicate a starting bit and length for non-fixed fields.

The downlink control may include a first physical downlink control channel (PDCCH) associated with the PDSCH transmission and a second PDCCH associated with the PDSCH transmission, where the first PDCCH indicates a parameter for a first UE associated with the PDSCH and the second PDCCH indicates a parameter for a second UE associated with the PDSCH, such as described in connection with FIG. 12. The first PDCCH and the second PDCCH may schedule the same PDSCH for the multiple UEs. The first PDCCH may be associated with a first identifier, the second PDCCH is associated with a second identifier, and the PDSCH is associated with a third identifier, where the first PDCCH and the second PDCCH indicate the third identifier for the PDSCH. A PDCCH may be associated with an identifier based on at least one of: coded bits of the PDCCH being scrambled by a sequence initialized by the identifier, a search space candidate for the PDCCH being based on the identifier, or a cyclic redundancy check (CRC) for the being scrambled by the identifier. The first identifier may include a first cell radio network temporary identifier (C-RNTI) and the second identifier may include a second C-RNTI. The third identifier may include a group radio network temporary identifier (G-RNTI). The first identifier, the second identifier, and the third identifier may each include a G-RNTI. The first PDCCH and the second PDCCH may each include a field that indicates the third identifier for the PDSCH. The field may indicate a multicast service included in the PDSCH.

Figure 16:
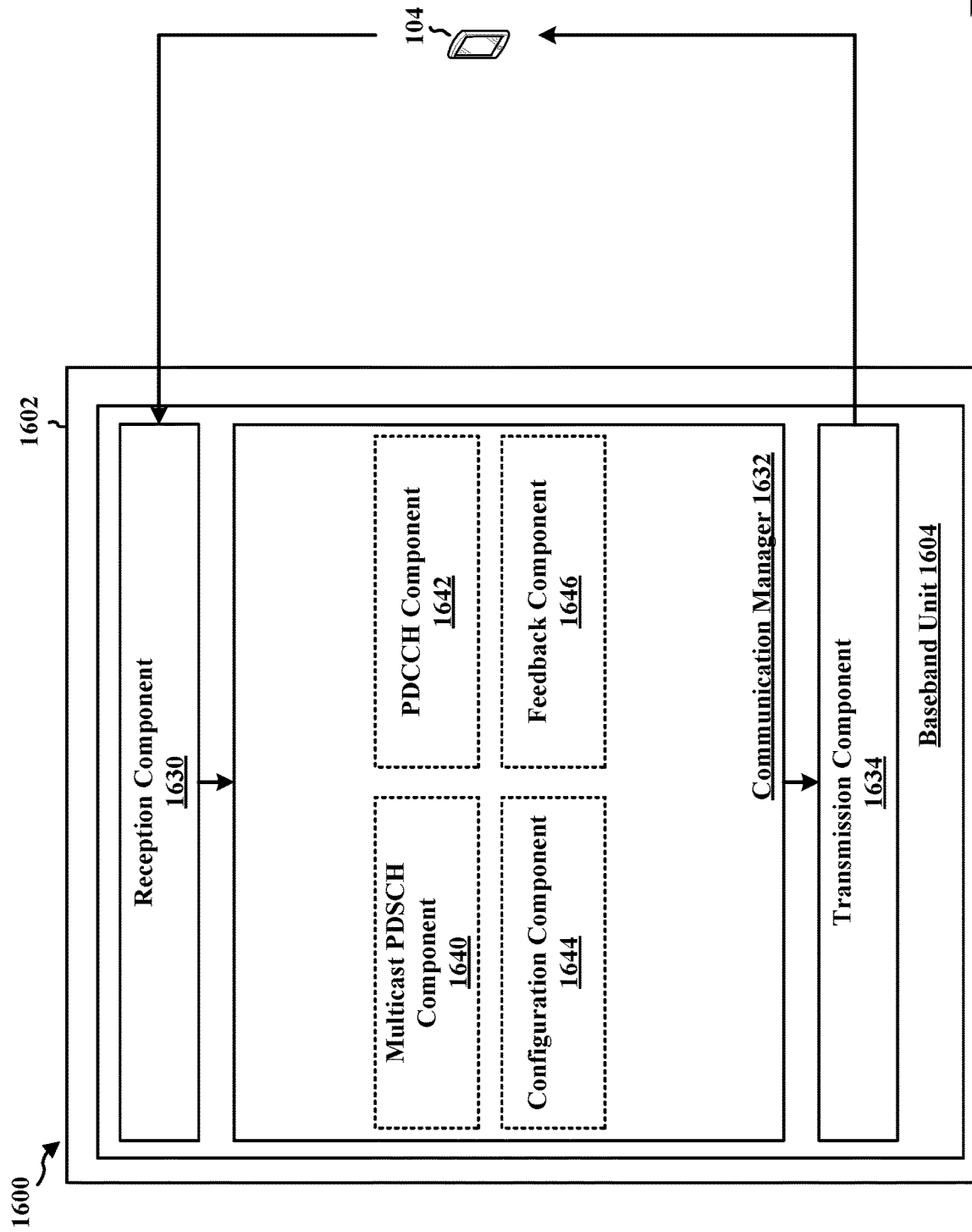
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station (e.g., base station 310), a component of a base station, or may implement base station functionality. The apparatus 1602 may include a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a multicast PDSCH component 1640 that multicast PDSCH, e.g., as described in connection with 1408 or 1508. The communication manager 1632 further includes a PDCCH component 1642 that transmits downlink control, e.g., as described in connection with 1406 or 1506. The communication manager 1632 may further includes a configuration component 1644 that configures a first UE and a second UE with sets of parameters associated with a set of codepoints, e.g., as described in connection with 1502 and 1504. The communication manager 1632 may further include a feedback component 1646 configured to receive feedback for the multicast PDSCH from multiple UEs based on the different parameters configured for the UEs and indicated in the PDCCH.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for multicasting a PDSCH transmission and means for transmitting downlink control associated with the PDSCH, where the downlink control includes different parameters for uplink transmissions to multiple UEs. The apparatus may further include means for configuring a first UE with a first set of parameters associated with a set of codepoint and configuring a second UE with a second set of parameters associated with the set of codepoints. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 17:
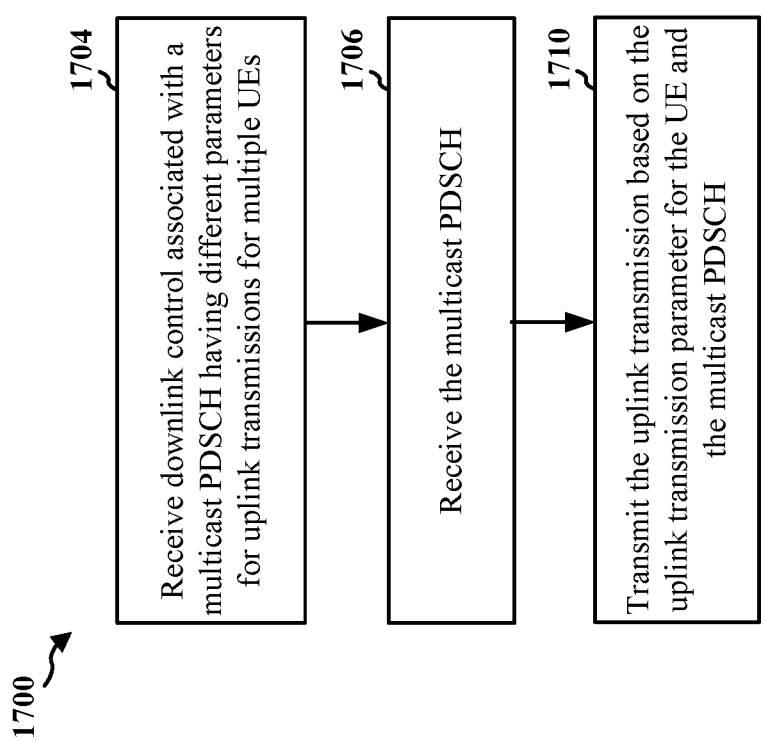
FIG. 17 is a flowchart of a method of wireless communication.

FIG. 17 is a flowchart 1700 of a method of wireless communication. The method may be performed by a UE (e.g., the UE 104, 350, 602, 604, 802, 804; the apparatus 1902). The method of flowchart 1800 includes the aspects of the flowchart 1700 and illustrates examples of additional aspects.

At 1704, the UE receives downlink control associated with a multicast PDSCH, wherein the downlink control includes different parameters for uplink transmissions to multiple UEs including an uplink transmission parameter for the UE. The downlink control may be associated with a first identifier, and the multicast PDSCH may be associated with a second identifier that is common to multiple UEs. Different aspects for indicating the different parameters to the UEs are described in connection with FIGS. 4-12. Any combination of aspects may be applied to indicate different parameters to different UEs. The different parameters may include different timing parameters for HARQ feedback. The different parameters may include the different timing parameters between reception of the PDSCH and transmission of the HARQ feedback. The different parameters may include different parameters for a HARQ codebook. The different parameters may be for a SUL transmission or a NUL transmission. The different parameters may include different DAI, for example. The reception may be performed by the PDCCH component 1942 of the apparatus 1902.

At 1706, the UE receives the multicast PDSCH. For example, FIGS. 4, 6, 8, 12, and 13 illustrate example aspects of a multicast PDSCH transmission. The reception of the multicast may be performed, e.g., by the multicast PDSCH component 1940 of the apparatus 1902 in FIG. 19.

At 1710, the UE transmits the uplink transmission based on the uplink transmission parameter for the UE and the multicast PDSCH. As multiple UEs may receive a different uplink transmission parameter associated with the same multicast PDSCH, the UE may transmit the uplink transmission based on a particular uplink transmission parameter for the UE. The transmission may be performed, e.g., by the feedback component 1946 of the apparatus 1902.

Figure 18:
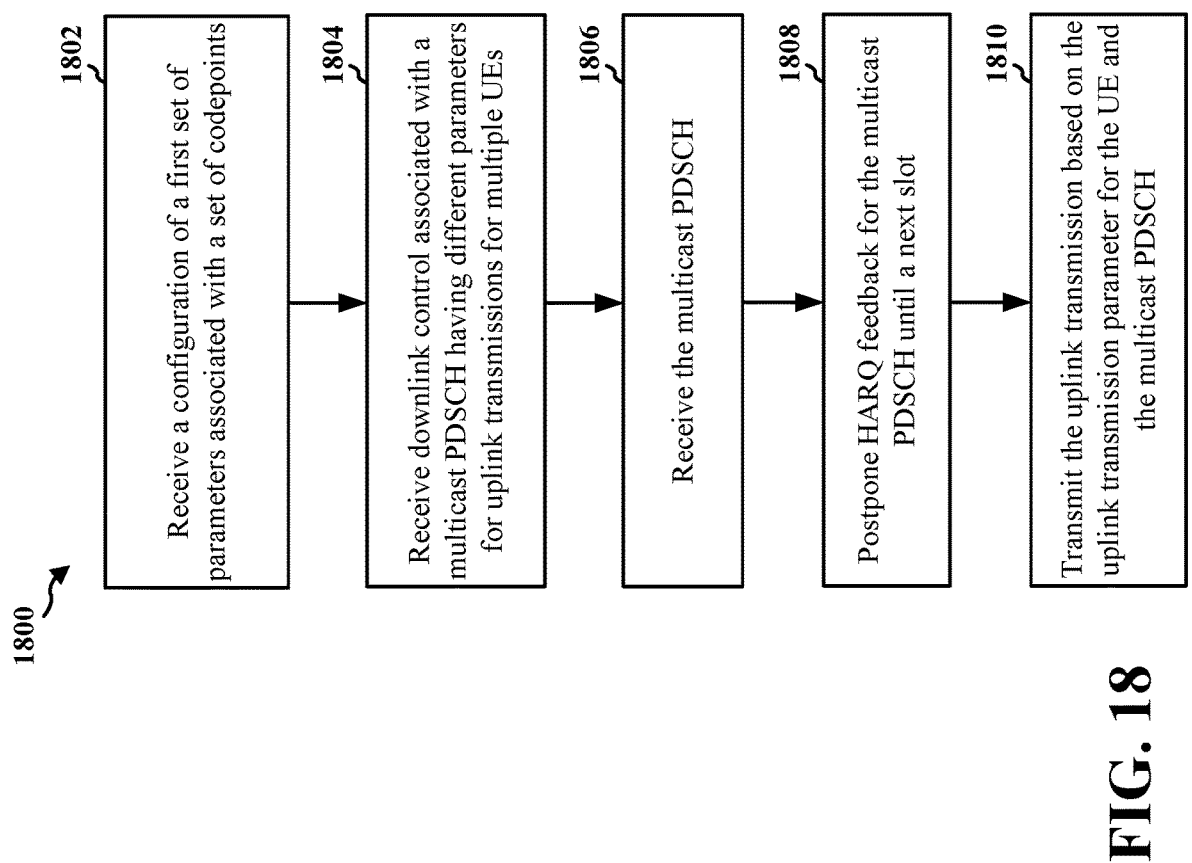
FIG. 18 is a flowchart of a method of wireless communication.

FIG. 18 is a flowchart 1800 of a method of wireless communication. The method may be performed by a UE (e.g., the UE 104, 350, 602, 604, 802, 804; the apparatus 1902). The method of flowchart 1800 includes the aspects of the flowchart 1700 and illustrates examples of additional aspects.

At 1804, the UE receives downlink control associated with a multicast PDSCH, where the downlink control includes different parameters for uplink transmissions to multiple UEs including an uplink transmission parameter for the UE. The downlink control may be associated with a first identifier, and the multicast PDSCH may be associated with a second identifier that is common to multiple UEs. Different aspects for indicating the different parameters to the UEs are described in connection with FIGS. 4-12. Any combination of aspects may be applied to indicate different parameters to different UEs. The different parameters may include different timing parameters for HARQ feedback. The different parameters may include the different timing parameters between reception of the PDSCH and transmission of the HARQ feedback. The different parameters may include different parameters for a HARQ codebook. The different parameters may be for a SUL transmission or a NUL transmission. The different parameters may include different DAI, for example. The reception may be performed by the PDCCH component 1942 of the apparatus 1902.

As illustrated at 1802, the UE may receive a configuration of a first set of parameters associated with a set of codepoints, such as described in connection with FIG. 5 or FIG. 6. The downlink control that is received at 1804 may include a codepoint from the set of codepoints and the UE transmits the uplink transmission using the parameter associated with the codepoint received in the downlink control. The reception of the configuration may be performed, e.g., by the configuration component 1944 of the apparatus 1902 in FIG. 19.

The downlink control may indicate a set of parameters and for each parameter indicates to each of the multiple UEs which parameter of the set of parameters to apply, e.g., as described in connection with FIG. 7-11.

The downlink control may include DCI including a sequence of fields, each of the fields being configured separately, e.g., as described in connection with any of FIGS. 7-11. The sequence of fields may include one or more of: a first reserved type of field, which the UE ignores; and a second reserved type of field, which the UE compares with a value, e.g., as described in connection with FIG. 10.

The downlink control may indicate a change for the parameter relative to an idle mode configuration, e.g., a delta configuration. An example delta configuration is described in connection with FIG. 11. The downlink control may include one or more fields that are defined or derived from a separate configuration. The downlink control may include one or more fixed fields. The downlink control may indicate a starting bit and length for non-fixed fields, and where the UE determines the uplink transmission parameter using the indicated starting bit and length.

The downlink control may be associated with a first identifier and the PDSCH may be associated with a second identifier. An example of different identifiers is described in connection with FIG. 12. A PDCCH may be associated with an identifier based on at least one of: coded bits of the PDCCH being scrambled by a sequence initialized by the identifier, a search space candidate for the PDCCH being based on the identifier, or a CRC for the being scrambled by the identifier. The first identifier may include a first C-RNTI and the second identifier may include a G-RNTI. The first identifier may include a first G-RNTI and the second identifier may include a second G-RNTI. The DCI may include a field that indicates the second identifier for the PDSCH. The field may indicate a multicast service included in the PDSCH.

At 1806, the UE receives the multicast PDSCH. For example, FIGS. 4, 6, 8, 12, and 13 illustrate example aspects of a multicast PDSCH transmission. The reception of the multicast may be performed, e.g., by the multicast PDSCH component 1940 of the apparatus 1902 in FIG. 19.

At 1810, the UE transmits the uplink transmission based on the uplink transmission parameter for the UE and the multicast PDSCH. The transmission may be performed, e.g., by the feedback component 1946 of the apparatus 1902. In some examples, the UE may postpone the HARQ feedback for the multicast PDSCH until a next slot if the downlink control schedules the HARQ feedback in a downlink only slot, as illustrated at 1808. FIG. 13 illustrates an example of postponing the HARQ feedback.

Figure 19:
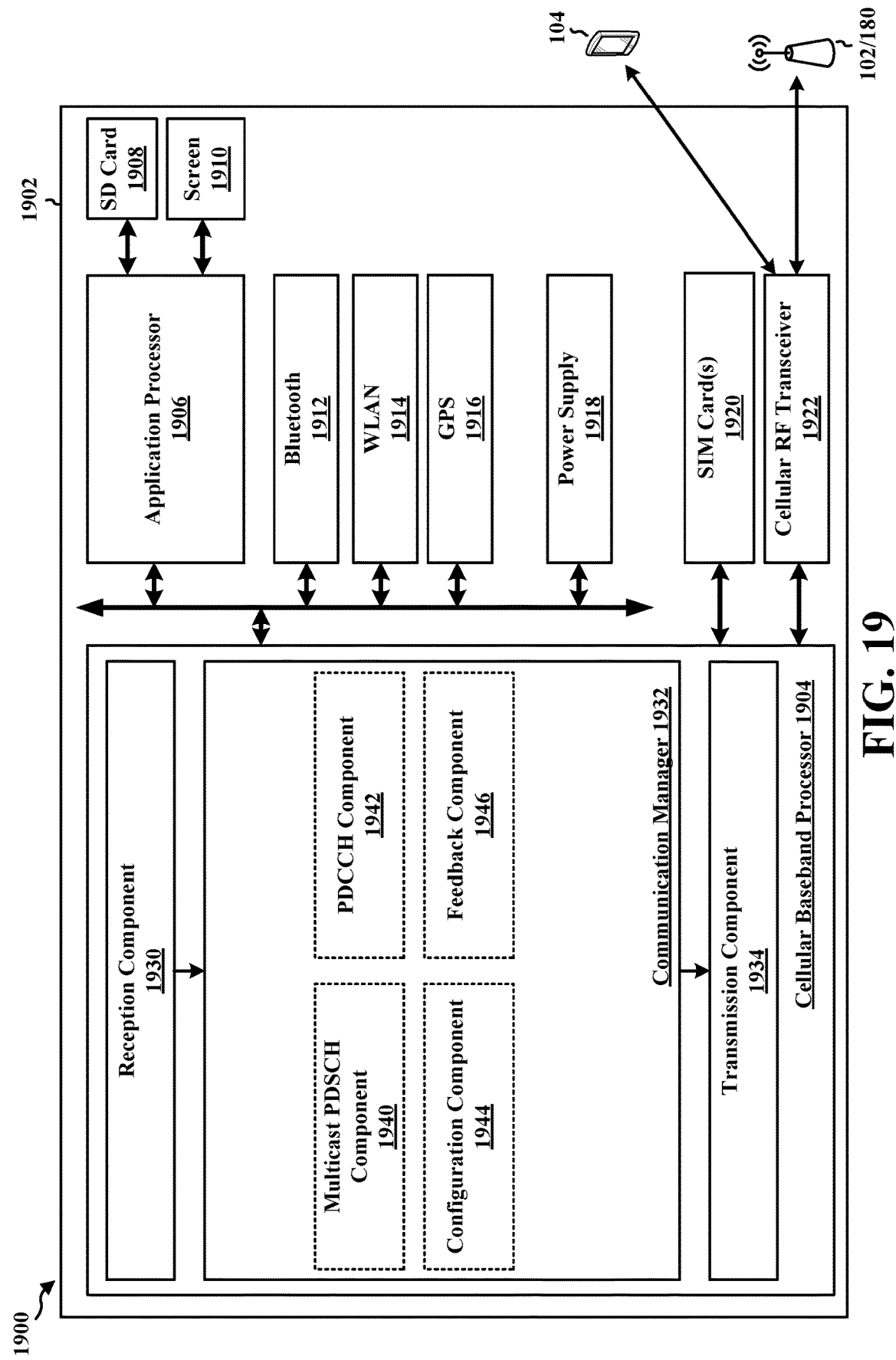
FIG. 19 is a diagram illustrating an example of a hardware implementation for an example apparatus.

FIG. 19 is a diagram 1900 illustrating an example of a hardware implementation for an apparatus 1902. The apparatus 1902 may be a UE, a component of a UE, or may implement UE functionality. The apparatus 1902 may include a cellular baseband processor 1904 (also referred to as a modem) coupled to a cellular RF transceiver 1922. The apparatus 1902 may further include one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and/or a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the cellular baseband processor 1904, and in another configuration, the apparatus 1902 may be the entire UE (e.g., see 350 of FIG. 3) and include the additional modules of the apparatus 1902.

The communication manager 1932 includes a multicast PDSCH component 1940 that receives a multicast PDSCH, e.g., as described in connection with 1806. The communication manager 1932 further includes a PDCCH component 1942 that receives downlink control, e.g., as described in connection with 1804. The communication manager 1932 may further include a configuration component 1944 that receives a configuration of a set of parameters associated with a set of codepoints, e.g., as described in connection with 1802. The communication manager 1932 may further include a feedback component 1946 configured to transmit feedback for the multicast PDSCH based on the multicast PDSCH and the parameter indicated in the PDCCH, e.g., as described in connection with 1810.

The apparatus may include additional components that perform each of the blocks of the algorithm in the flowchart of FIG. 18. As such, each block in the flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the cellular baseband processor 1904, includes means for receiving downlink control associated with a multicast PDSCH, where the downlink control includes different parameters for uplink transmissions to multiple UEs including an uplink transmission parameter for the UE. The apparatus 1902 may further include means for receiving the multicast PDSCH and means for transmitting the uplink transmission based on the uplink transmission parameter for the UE and the multicast PDSCH. The apparatus 1902 may further include means for postponing HARQ feedback for the multicast PDSCH until a next slot if the downlink control schedules the HARQ feedback in a downlink only slot. The apparatus may further include means for a configuration of a first set of parameters associated with a set of codepoints, where the downlink control includes a codepoint from the set of codepoints and the apparatus transmits the uplink transmission using the parameter associated with the codepoint received in the downlink control. The means may be one or more of the components of the apparatus 1902 configured to perform the functions recited by the means. As described supra, the apparatus 1902 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a base station, comprising: transmitting downlink control associated with a PDSCH transmission for multicast, wherein the downlink control comprises different parameters for uplink transmissions to multiple UE; and transmitting the PDSCH transmission.

In aspect 2, the method of aspect 1 further includes that the downlink control includes a first physical PDCCH associated with the PDSCH transmission and a second PDCCH associated with the PDSCH transmission, wherein the first PDCCH indicates a first parameter for a first UE associated with the PDSCH and the second PDCCH indicates a second parameter for a second UE associated with the PDSCH.

In aspect 3, the method of aspect 2 further includes that the first PDCCH and the second PDCCH schedule the same PDSCH for the multiple UEs.

In aspect 4, the method of aspect 2 or aspect 3 further includes that the first PDCCH is associated with a first identifier, the second PDCCH is associated with a second identifier, and the PDSCH is associated with a third identifier, wherein the first PDCCH and the second PDCCH indicate the third identifier for the PDSCH.

In aspect 5, the method of any of aspects 2-4 further includes that the PDCCH is associated with an identifier based on at least one of: coded bits of the PDCCH being scrambled by a sequence initialized by the identifier, a search space candidate for the PDCCH being based on the identifier, or a CRC for the PDCCH being scrambled by the identifier.

In aspect 6, the method of aspect 4 or aspect 5 further includes that the first identifier comprises a first C-RNTI and the second identifier comprises a second C-RNTI.

In aspect 7, the method of any of aspects 4-6 further includes that the third identifier comprises a G-RNTI.

In aspect 8, the method of any of aspects 4, 5, or 7 further includes that the first identifier, the second identifier, and the third identifier each comprise a G-RNTI.

In aspect 9, the method of any of aspects 4-8 further includes that the first PDCCH and the second PDCCH include a field that indicates the third identifier for the PDSCH.

In aspect 10, the method of aspect 9 further includes that the field indicates a multicast service included in the PDSCH.

In aspect 11, the method of any of aspects 1-10 further includes that the different parameters include different timing parameters for HARQ feedback.

In aspect 12, the method of aspect 11 further includes that the different parameters include the different timing parameters between reception of the PDSCH and transmission of the HARQ feedback.

In aspect 13, the method of aspect 11 or aspect 12 further includes that the different parameters include the, different parameters for a HARQ codebook.

In aspect 14, the method of any of aspects 11-13 further includes that the different parameters are for a DAI, a SUL transmission or a NUL transmission.

In aspect 15, the method of any of aspects 1-14 further includes configuring a first UE with a first set of parameters associated with a set of codepoints; and configuring a second UE with a second set of parameters associated with the set of codepoints, wherein the downlink control comprises a codepoint from the set of codepoints.

In aspect 16, the method of any of aspects 1-15 further includes that the downlink control indicates a set of parameters and for each parameter indicates to each of the multiple UEs which parameter of the set of parameters to apply.

In aspect 17, the method of aspect 16 further includes that the downlink control comprises DCI including a sequence of fields, each of the fields being configured separately.

In aspect 18, the method of aspect 17 further includes that the sequence of fields includes one or more of: a first reserved type of field, which the UE ignores; and a second reserved type of field, which the UE compares with a value.

In aspect 19, the method of aspect 17 further includes that the downlink control indicates changes for the different parameters relative to an idle mode configuration.

In aspect 20, the method of aspect 17 further includes that the downlink control includes one or more fields that are defined or derived from a separate configuration.

In aspect 21, the method of aspect 17 further includes that the downlink control includes one or more fixed fields.

In aspect 22, the method of aspect 17 further includes that the downlink control indicates a starting bit and length for non-fixed fields.

Aspect 23 is an apparatus for wireless communication including memory and at least one processor coupled to a memory and configured to perform the method of any of aspects 1-22.

In aspect 24, the apparatus of aspect 23 further comprises a transceiver coupled to the memory and the at least one processor.

Aspect 25 is an apparatus for wireless communication including means for implementing any of aspects 1 to 22.

In aspect 26, the apparatus of aspect 25 further comprises a transceiver.

Aspect 27 is a non-transitory computer-readable medium storing computer executable code, where the code when executed by a processor causes the processor to implement any of aspects 1 to 22.

Aspect 28 is a method of wireless communication at a UE, comprising: receiving downlink control associated with a multicast PDSCH, wherein the downlink control comprises different parameters for uplink transmissions to multiple UEs including an uplink transmission parameter for the UE; receiving the multicast PDSCH; and transmitting the uplink transmission based on the uplink transmission parameter for the UE and the multicast PDSCH.

In aspect 29, the method of aspect 28 further includes that the downlink control is associated with a first identifier and the multicast PDSCH is associated with a second identifier that is common to multiple UEs.

In aspect 30, the method of aspect 29 further includes that the first identifier is based on at least one of: coded bits of the PDCCH being scrambled by a sequence initialized by the identifier, a search space candidate for the PDCCH being based on the ID, or a CRC for the PDCCH being scrambled by the identifier.

In aspect 31, the method of aspect 29 or aspect 30 further includes that the first identifier comprises a first C-RNTI and the second identifier includes a G-RNTI.

In aspect 32, the method of aspect 29 or aspect 30 further includes that the first identifier comprises a first G-RNTI and the second identifier comprises a second G-RNTI.

In aspect 33, the method of any of aspects 27-32 further includes that the downlink control includes a field that indicates the second identifier for the PDSCH.

In aspect 34, the method of aspect 33 further includes that the field indicates a multicast service included in the PDSCH.

In aspect 35, the method of any of aspects 28-34 further includes that the uplink transmission parameter includes a timing parameter for HARQ feedback.

In aspect 36, the method of aspect 35 further includes that the timing parameter is the timing parameter between reception of the PDSCH and transmission of the HARQ feedback.

In aspect 37, the method of any of aspects 28-36 further includes that the uplink transmission parameter is for a HARQ codebook.

In aspect 38, the method of any of aspects 28-36 further includes that the uplink transmission parameter is for a DAI, a SUL transmission, or a NUL transmission.

In aspect 39, the method of any of aspects 28-38 further includes receiving a configuration of a first set of parameters associated with a set of codepoints, wherein the downlink control comprises a codepoint from the set of codepoints and the UE transmits the uplink transmission using the parameter associated with the codepoint received in the downlink control.

In aspect 40, the method of any of aspects 28-39 further includes the downlink control indicates a set of parameters and for each parameter indicates to each of the multiple UEs which parameter of the set of parameters to apply.

In aspect 41, the method of aspect 40 further includes that the downlink control comprises DCI including a sequence of fields, each of the fields being configured separately.

In aspect 42, the method of aspect 41 further includes that the sequence of fields includes one or more of: a first reserved type of field, which the UE ignores; or a second reserved type of field, which the UE compares with a value.

In aspect 43, the method of any of aspect 28-41 further includes that the downlink control indicates a change for the parameter relative to an idle mode configuration.

In aspect 43, the method of any of aspect 28-42 further includes that the downlink control includes one or more fields that are defined or derived from a separate configuration.

In aspect 44, the method of any of aspect 28-43 further includes that the downlink control includes one or more fixed fields.

In aspect 45, the method of any of aspect 28-44 further includes that the downlink control indicates a starting bit and length for non-fixed fields, and wherein the UE determines the uplink transmission parameter using the indicated starting bit and length.

In aspect 46, the method of any of aspect 28-45 further includes postponing HARQ feedback for the multicast PDSCH until a next slot if the downlink control schedules the HARQ feedback in a downlink only slot.

Aspect 47 is an apparatus for wireless communication including memory and at least one processor coupled to a memory and configured to perform the method of any of aspects 28 to 46.

In aspect 48, the apparatus of aspect 47 further comprises a transceiver coupled to the memory and the at least one processor.

Aspect 49 is an apparatus for wireless communication including means for implementing any of aspects 28 to 46.

In aspect 50, the apparatus of aspect 49 further comprises a transceiver.

Aspect 51 is a non-transitory computer-readable medium storing computer executable code, where the code when executed by a processor causes the processor to implement any of aspects 28 to 46.

What is claimed is:

1. An apparatus for wireless communication at a base station, comprising:
   a memory; and
   at least one processor coupled to the memory and configured to:
      transmit downlink control information (DCI) associated with a physical downlink shared channel (PDSCH) transmission for multicast to multiple user equipments (UEs), wherein the DCI indicates different parameters for the multiple UEs for uplink transmissions associated with the PDSCH transmission wherein the different parameters include a first parameter for the uplink transmissions from a first UE based on carrier aggregation and a second parameter for the uplink transmissions from a second UE that is not based on the carrier aggregation; and
      transmit the PDSCH transmission.

2. The apparatus of claim 1, wherein the DCI includes a first physical downlink control channel (PDCCH) transmission associated with the PDSCH transmission and a second PDCCH transmission associated with a same PDSCH transmission, wherein the first PDCCH transmission comprises a first DCI that indicates the first parameter for the uplink transmissions from the first UE associated with the PDSCH transmission and in a different carrier than the PDSCH transmission, and wherein the second PDCCH transmission comprises a second DCI that indicates the second parameter for the uplink transmissions from the second UE associated with the same PDSCH transmission and in a same carrier as the PDSCH transmission.

3. The apparatus of claim 2, wherein the first DCI and the second DCI schedule the same PDSCH for the multiple UEs.

4. The apparatus of claim 3, wherein the first DCI and the second DCI for the PDSCH transmission indicate a third identifier for the multiple UEs that is associated with the PDSCH, and wherein the first PDCCH transmission is associated with a first identifier that identifies the first UE of the multiple UEs, and the second PDCCH is associated with a second identifier that identifies the second UE of the multiple UEs.

5. The apparatus of claim 4, wherein each PDCCH transmission of the first PDCCH transmission and the second PDCCH transmission is associated with a corresponding identifier based on at least one of:
   coded bits of the PDCCH being scrambled by a sequence initialized by the identifier,
   a search space candidate for the PDCCH being based on the identifier, or
   a cyclic redundancy check (CRC) for the PDCCH being scrambled by the identifier.

6. The apparatus of claim 4, wherein the first identifier comprises a first cell radio network temporary identifier (C-RNTI) and the second identifier comprises a second C-RNTI, and the third identifier comprises a group radio network temporary identifier (G-RNTI).

7. The apparatus of claim 4, wherein the first identifier, the second identifier, and the third identifier each comprise a G-RNTI.

8. The apparatus of claim 4, wherein the first PDCCH transmission and the second PDCCH transmission include a field that indicates the third identifier for the PDSCH transmission.

9. The apparatus of claim 8, wherein the field indicates a multicast service included in the PDSCH transmission.

10. The apparatus of claim 1, wherein the different parameters include one or more of different timing parameters for hybrid automatic repeat request (HARQ) feedback, different parameters for a hybrid automatic repeat request (HARQ) codebook, and wherein the different parameters are for a downlink assignment indicator (DAI), a supplementary uplink (SUL) transmission or a normal uplink (NUL) transmission.

11. The apparatus of claim 1, wherein the at least one processor is further configured to:
configure the first UE with a first set of parameters associated with a set of codepoints; and
configure the second UE with a second set of parameters associated with the set of codepoints,
wherein the DCI is a single DCI that comprises a codepoint from the set of codepoints, wherein the codepoint indicates the first parameter for the uplink transmissions from the first UE associated with the PDSCH transmission and in a different carrier than the PDSCH transmission, and wherein the codepoint indicates the second parameter for the uplink transmissions from the second UE associated with a same PDSCH transmission and in a same carrier as the PDSCH transmission.

12. The apparatus of claim 1, wherein the DCI is a single DCI that indicates a set of parameters and for each parameter indicates to each of the multiple UEs which parameter of the set of parameters to apply.

13. The apparatus of claim 12, wherein the single DCI that comprises a sequence of fields, each of the fields being configured separately, and the sequence of fields includes one or more of:
a first reserved type of field, which the UE ignores; and
a second reserved type of field, which the UE compares with a value.

14. The apparatus of claim 12, wherein the single DCI that indicates changes for the different parameters relative to an idle mode configuration.

15. The apparatus of claim 12, wherein the single DCI that includes one or more fields that are defined or derived from a separate configuration.

16. The apparatus of claim 12, wherein the single DCI that includes one or more fixed fields indicates a starting bit and length for non-fixed fields.

17. An apparatus for wireless communication at a user equipment (UE), comprising:
a memory; and
at least one processor coupled to the memory and configured to:
receive downlink control information (DCI) associated with a multicast physical downlink shared channel (PDSCH) for multiple user equipments (UEs), wherein the DCI indicates different parameters for the multiple UEs for uplink transmissions associated with the multicast PDSCH including an uplink transmission parameter for the UE, wherein the different parameters include a first parameter for the uplink transmissions from a first UE based on carrier aggregation and a second parameter for the uplink transmissions from a second UE that is not based on the carrier aggregation;
receive the multicast PDSCH; and
transmit uplink transmission based on the uplink transmission parameter for the UE and the multicast PDSCH.

18. The apparatus of claim 17, wherein the DCI is comprised in a physical downlink control channel transmission, which is associated with a first identifier that identifies the UE, and the multicast PDSCH is associated with a second identifier that is common to the multiple UEs.

19. The apparatus of claim 18, wherein the first identifier is based on at least one of:
coded bits of a physical downlink control channel (PDCCH) being scrambled by a sequence initialized by the identifier,
a search space candidate for the PDCCH being based on the identifier, or
a cyclic redundancy check (CRC) for the PDCCH being scrambled by the identifier.

20. The apparatus of claim 18, wherein the first identifier comprises a first cell radio network temporary identifier (C-RNTI) and the second identifier includes a group radio network temporary identifier (G-RNTI).

21. The apparatus of claim 18, wherein the first identifier comprises a first group radio network temporary identifier (G-RNTI) and the second identifier comprises a second G-RNTI.

22. The apparatus of claim 18, wherein the DCI includes a field that indicates the second identifier for the PDSCH.

23. The apparatus of claim 22, wherein the field indicates a multicast service included in the PDSCH.

24. The apparatus of claim 17, wherein the uplink transmission parameter includes at least one of a timing parameter for hybrid automatic repeat request (HARQ) feedback, or a hybrid automatic repeat request (HARQ) codebook, the uplink transmission parameter being for a downlink assignment indicator (DAI), a supplementary uplink (SUL) transmission, or a normal uplink (NUL) transmission.

25. The apparatus of claim 17, wherein the at least one processor is further configured to:
receive a configuration of a first set of parameters associated with a set of codepoints, wherein the DCI comprises a codepoint from the set of codepoints, and wherein the uplink transmission is based on a parameter from the first set of parameters associated with the codepoint received in the DCI.

26. The apparatus of claim 17, wherein the DCI is a single DCI that indicates a set of parameters and for each parameter indicates to each of the multiple UEs which parameter of the set of parameters to apply.

27. The apparatus of claim 26, wherein the downlink control and comprises a sequence of fields, each of the fields being configured separately.

28. The apparatus of claim 17, further comprising:
postpone hybrid automatic repeat request (HARQ) feedback for the multicast PDSCH until a next slot if the DCI schedules the HARQ feedback in a downlink only slot.

29. A method of wireless communication at a base station, comprising:
transmitting downlink control information (DCI) associated with a physical downlink shared channel (PDSCH) transmission for multicast to multiple user equipments (UEs), wherein the DCI indicates different parameters for the multiple UEs for uplink transmissions associated with the PDSCH transmission wherein the different parameters include a first parameter for the uplink transmissions from a first UE based on carrier aggregation and a second parameter for the uplink transmissions from a second UE that is not based on the carrier aggregation; and
transmitting the PDSCH transmission.

30. A method of wireless communication at a user equipment (UE), comprising:
- receiving downlink control information (DCI) associated with a multicast physical downlink shared channel (PDSCH) for multiple user equipments (UEs), wherein the DCI indicates different parameters for the multiple UEs for uplink transmissions associated with the multicast PDSCH including an uplink transmission parameter for the UE, wherein the different parameters include a first parameter for the uplink transmissions from a first UE based on carrier aggregation and a second parameter for the uplink transmissions from a second UE that is not based on the carrier aggregation;
- receiving the multicast PDSCH; and
- transmitting the uplink transmission based on the uplink transmission parameter for the UE and the multicast PDSCH.

* * * * *